US011006117B2

(12) United States Patent
Chuang et al.

(10) Patent No.: US 11,006,117 B2
(45) Date of Patent: *May 11, 2021

(54) METHOD AND APPARATUS FOR RANGE DERIVATION IN CONTEXT ADAPTIVE BINARY ARITHMETIC CODING

(71) Applicant: MEDIATEK INC., Hsinchu (TW)

(72) Inventors: Tzu-Der Chuang, Hsinchu (TW); Ching-Yeh Chen, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/629,440

(22) PCT Filed: Jul. 12, 2018

(86) PCT No.: PCT/CN2018/095419
§ 371 (c)(1),
(2) Date: Jan. 8, 2020

(87) PCT Pub. No.: WO2019/011292
PCT Pub. Date: Jan. 17, 2019

(65) Prior Publication Data
US 2020/0186802 A1    Jun. 11, 2020

Related U.S. Application Data

(60) Provisional application No. 62/693,497, filed on Jul. 3, 2018, provisional application No. 62/678,343, filed
(Continued)

(51) Int. Cl.
*H04N 19/13* (2014.01)
(52) U.S. Cl.
CPC .................. *H04N 19/13* (2014.11)

(58) Field of Classification Search
CPC ............... H04N 19/13; H04N 19/91
See application file for complete search history.

(56) References Cited

U.S. PATENT DOCUMENTS 9,425,822 B2    8/2016  Zhou
9,521,433 B2    12/2016 Chono et al.
(Continued)

FOREIGN PATENT DOCUMENTS

CN      101933331 A     12/2010
CN      102223149 A     10/2011
(Continued)

OTHER PUBLICATIONS

Yu et al., "A High Performance CABAC Decoding Architecture" IEEE Transactions on Consumer Electronics, vol. 51, No. 4, Nov. 2005.*
(Continued)

*Primary Examiner* — Michael J Hess
(74) *Attorney, Agent, or Firm* — McClure, Qualey & Rodack, LLP

(57) ABSTRACT

A method and apparatus of entropy coding of coding symbols using Context-Based Adaptive Binary Arithmetic Coder (CABAC) are disclosed. According to the present invention, a math formula is used for calculating the LPS range for deriving rangeOne value and rangeZero value. For example, the LPS range is derived using one or more mathematical operations comprising calculating a multiplication of a first value and a second value, in which the first value is related to (2*the LPS probability index+1) or the LPS probability index, while the second value is related to (2*the range index+1) or the range index. Besides, the LPS range can be derived by using a look-up-table including table contents corresponding to values of LPS range associated with a set of LPS probability indexes and a set of
(Continued)

range indexes for encoding or decoding a binary value of the current bin.

22 Claims, 4 Drawing Sheets

Related U.S. Application Data on May 31, 2018, provisional application No. 62/670,614, filed on May 11, 2018, provisional application No. 62/532,389, filed on Jul. 14, 2017.

(56) References Cited

U.S. PATENT DOCUMENTS

| | | | |
|---|---|---|---|
| 10,499,086 B2 | 12/2019 | Yu et al. | |
| 10,742,984 B2 | 8/2020 | Chuang et al. | |
| 2005/0123207 A1* | 6/2005 | Marpe | H04N 19/196 382/239 |
| 2014/0092985 A1 | 4/2014 | Kim et al. | |
| 2016/0043735 A1 | 2/2016 | Zhou | |
| 2016/0353110 A1 | 12/2016 | Zhang et al. | |
| 2018/0199046 A1* | 7/2018 | Chuang | H03M 7/4006 |
| 2018/0199048 A1* | 7/2018 | Said | H04N 19/42 |

FOREIGN PATENT DOCUMENTS

| | | | |
|---|---|---|---|
| CN | 103227924 A | 7/2013 | |
| CN | 104918049 A | 9/2015 | |
| JP | H11-112355 A | 4/1999 | |
| TW | 201701664 A | 1/2017 | |
| TW | 201832554 A | 9/2018 | |
| WO | 2016045565 A1 | 3/2016 | |
| WO | 2016184399 A1 | 11/2016 | |

OTHER PUBLICATIONS

Marpe et al., "Context-Based Adaptive Binary Arthmetic Coding in the H.264/AVC Video Compression Standard," IEEE Transactions on Circuits and Systems for Video Technology, vol. 13, No. 7, Jul. 2003.*

International Search Report and Written Opinion of the international searching authority, dated Sep. 27, 2018, issued in application No. PCT/CN2018/095419.

International Search Report dated Sep. 27, 2018, issued in application No. PCT/CN2018/095419.

Alshin, A., et al.; "High precision probability estimation for CABAC;" Dec. 2013; pp. 1-6.

International Search Report and Written Opinion, dated Mar. 27, 2018, from PCT/CN2018/071740.

European Search Report , dated Jul. 15, 2020, from application No. 18736507.0.

U.S. Non-Final Office Action, dated Oct. 29, 2020, in U.S. Appl. No. 15/863,547.

Alshin et al., "Multi-parameter probability up-date for CABAC" (published on Jul. 22, 2011).

Anonymous: "Probability" from Wikipedia (published on Dec. 22, 2016).

* cited by examiner

METHOD AND APPARATUS FOR RANGE DERIVATION IN CONTEXT ADAPTIVE BINARY ARITHMETIC CODING

CROSS REFERENCE TO RELATED APPLICATIONS

The present invention claims priority to U.S. Provisional Patent Application, Ser. No. 62/532,389, filed on Jul. 14, 2017, U.S. Provisional Patent Application, Ser. No. 62/670,614, filed on May 11, 2018, U.S. Provisional Patent Application, Ser. No. 62/678,343, filed on May 31, 2018 and U.S. Provisional Patent Application, Ser. No. 62/693,497, filed on Jul. 3, 2018. The U.S. Provisional Patent Application is hereby incorporated by reference in its entirety.

FIELD OF THE INVENTION

The present invention relates to entropy coding techniques for image coding and video coding. In particular, the present invention relates to range derivation for Context-Based Adaptive Binary Arithmetic Coder (CABAC) for image coding and video coding.

BACKGROUND AND RELATED PRIOR ART

The arithmetic coding is known as one of the efficient data compressing methods, and is widely used in coding standards, including JBIG, JPEG2000, H.264/AVC, and High-Efficiency Video Coding (HEVC). In H.264/AVC and HEVC Test Model Version 16.0 (HM-16.0), context-based adaptive binary arithmetic coding (CABAC) is adopted as the entropy coding tool in the video coding system.

As shown in FIG. 1(a), a CABAC encoder consists of three parts: binarization unit 110, context modelling unit 120, and binary arithmetic encoding unit 130. The CABAC encoding process comprises the binarization step, the context modelling step and the binary arithmetic encoding step. In the binarization step, each syntax element is uniquely mapped into a binary string (bin or bins). In the context modelling step, a probability model is selected for each bin. The corresponding probability model may depend on previously encoded syntax elements, bin indexes, and side information. After the binarization and the context model assignment, a bin value along with its associated model is transmitted to the binary arithmetic encoding unit 130 for generating the bitstream. On the other hand, a CABAC decoder receives the bitstream, and performs a CABAC decoding process corresponding to the foregoing CABAC encoding process on the bitstream so as to derive the values of the syntax elements. As shown in FIG. 1(b), a CABAC decoder consists of three parts: de-binarization unit 150, context modelling unit 160, and binary arithmetic decoding unit 140. The CABAC decoding process comprises the binary arithmetic decoding step, the de-binarization step and the context modelling step. In de-binarization step and context modelling step, according to the target decoding syntax element, a probability model is selected for each bin. The corresponding probability model may depend on previously decoded syntax elements, bin indexes, and side information. According to the probability model, a bin value is parsed by the binary arithmetic decoding unit 140. A syntax element is decoded by the de-binarization unit 150.

Binary arithmetic encoding in 130 is a recursive interval-subdividing procedure. The output bitstream is the pointer to the final probability of coding interval. The probability of coding interval, T is specified by range and the lower bound of coding interval (designated as "low" in the following discussion). The range is the possible scope of the coding interval. Depending on whether the current symbol is the most probable symbol (MPS) or the least probable symbol (LPS), the next coding interval is updated as one of the two sub-intervals accordingly, as shown in eq. (1) and eq. (2).

$$range_{n+1} = \begin{cases} range_n - rangeLPS_n, & \text{if } MPS \\ rangeLPS_n, & \text{if } LPS \end{cases} \quad (1)$$

$$low_{n+1} = \begin{cases} low_n, & \text{if } MPS \\ low_n + range_n - rangeLPS_n, & \text{if } LPS \end{cases} \quad (2)$$

where rangeLPS is the estimated range when LPS is coded.

FIG. 2 illustrates the concept of the binary arithmetic coding. Initially, the probability range (i.e., $range_0$) is 1 and the low boundary (i.e., $low_0$) is 0 as indicated by probability scale 210. If the first symbol is a MPS symbol, a pointer in the lower part of the probability scale 210 may be used to signal the event of an MPS symbol. The $range_1$ is used as the probability scale 220 for processing the next symbol. Again, the probability scale 220 is divided into two parts for MPS and LPS respectively. If the second symbol is an LPS symbol, the $rangeLPS_1$ is selected as the probability scale 230 for the next symbol. Every time when a new symbol is coded, the corresponding range becomes smaller. When a range becomes too small, the range can be re-normalized to form a probability scale 240 with larger range.

In modern arithmetic coding, the probability update is often done according to a model. For example, a method is described by Marpe, et al., in a technical publication ("Context-Based Adaptive Binary Arithmetic Coding in the H.264/AVC Video Compression Standard", *IEEE Transactions on Circuits and Systems for Video Technology*, Vol. 13, No. 7, pp. 620-636, July 2003), where the following formula is used:

$$p_{new} = (1-\alpha) \cdot y + \alpha \cdot p_{old}. \quad (3)$$

In the above equation, y is equal to "zero" if current symbol is a most probable symbol (MPS); otherwise, y is equal to "one". This formula provides an estimated value for probability of the least probable symbol (LPS). The weighting $\alpha$ is derived according to the following equation:

$$\alpha = (\min\_prob/0.5)^{(1/state\_number)}, \quad (4)$$

where min_prob corresponds to the minimum probability of the least probable symbol of CABAC and state_number corresponds to the number of context states for probability value estimation.

For CABAC of HEVC, there are 64 probability states. The min_prob is 0.01875, and the state_number is 63. Each state has a probability value indicating the probability to select the LPS. The 64 representative probability values, $P_\sigma \in [0.01875, 0.5]$, were derived for the LPS by the following recursive equation:

$$P_\sigma = \alpha \cdot P_{\sigma-1} \text{ for all } \sigma = 1, \ldots, 63, \quad (5)$$

with $\alpha = (0.01875/0.5)^{1/63}$ and $p_0 = 0.5$

The rangeLPS value of a state $\sigma$ is derived by the following equation:

$$rangeLPS_\sigma = RANGE \times P_\sigma \quad (6)$$

To reduce the computations required for deriving rangeLPS, the result of rangeLPS of each range value can be pre-calculated and stored in a lookup table (LUT). In H.264/

AVC and HEVC, a 4-column pre-calculated rangeLPS table is adopted to reduce the table size as shown in Table 1. The range is divided into four segments. In each segment, the rangeLPS of each probability state σ ($p_\sigma$) is pre-defined. In other words, the rangeLPS of a probability state σ is quantized into four values. The rangeLPS selected depends on the segment that the range belongs to.

TABLE 1

| | (Range >> 6)&3 Sets | | | |
|---|---|---|---|---|
| | 0 | 1 | 2 | 3 |
| | Range Min | | | |
| | 256 | 320 | 384 | 448 |
| | Range Max | | | |
| State | 319 | 383 | 447 | 510 |
| | Range LPS | | | |
| 0 | 128 | 176 | 208 | 240 |
| 1 | 128 | 167 | 197 | 227 |
| 2 | 128 | 158 | 187 | 216 |
| 3 | 123 | 150 | 178 | 205 |
| 4 | 116 | 142 | 169 | 195 |
| 5 | 111 | 135 | 160 | 185 |
| 6 | 105 | 128 | 152 | 175 |
| 7 | 100 | 122 | 144 | 166 |
| 8 | 95 | 116 | 137 | 158 |
| 9 | 90 | 110 | 130 | 150 |
| 10 | 85 | 104 | 123 | 142 |
| 11 | 81 | 99 | 117 | 135 |
| 12 | 77 | 94 | 111 | 128 |
| 13 | 73 | 89 | 105 | 122 |
| 14 | 69 | 85 | 100 | 116 |
| 15 | 66 | 80 | 95 | 110 |
| 16 | 62 | 76 | 90 | 104 |
| 17 | 59 | 72 | 86 | 99 |
| 18 | 56 | 69 | 81 | 94 |
| 19 | 53 | 65 | 77 | 89 |
| 20 | 51 | 62 | 73 | 85 |
| 21 | 48 | 59 | 69 | 80 |
| 22 | 46 | 56 | 66 | 76 |
| 23 | 43 | 53 | 63 | 72 |
| 24 | 41 | 50 | 59 | 69 |
| 25 | 39 | 48 | 56 | 65 |
| 26 | 37 | 45 | 54 | 62 |
| 27 | 35 | 43 | 51 | 59 |
| 28 | 33 | 41 | 48 | 56 |
| 29 | 32 | 39 | 46 | 53 |
| 30 | 30 | 37 | 43 | 50 |
| 31 | 29 | 35 | 41 | 48 |
| 32 | 27 | 33 | 39 | 45 |
| 33 | 26 | 31 | 37 | 43 |
| 34 | 24 | 30 | 35 | 41 |
| 35 | 23 | 28 | 33 | 39 |
| 36 | 22 | 27 | 32 | 37 |
| 37 | 21 | 26 | 30 | 35 |
| 38 | 20 | 24 | 29 | 33 |
| 39 | 19 | 23 | 27 | 31 |
| 40 | 18 | 22 | 26 | 30 |
| 41 | 17 | 21 | 25 | 28 |
| 42 | 16 | 20 | 23 | 27 |
| 43 | 15 | 19 | 22 | 25 |
| 44 | 14 | 18 | 21 | 24 |
| 45 | 14 | 17 | 20 | 23 |
| 46 | 13 | 16 | 19 | 22 |
| 47 | 12 | 15 | 18 | 21 |
| 48 | 12 | 14 | 17 | 20 |
| 49 | 11 | 14 | 16 | 19 |
| 50 | 11 | 13 | 15 | 18 |
| 51 | 10 | 12 | 15 | 17 |
| 52 | 10 | 12 | 14 | 16 |
| 53 | 9 | 11 | 13 | 15 |
| 54 | 9 | 11 | 12 | 14 |
| 55 | 8 | 10 | 12 | 14 |
| 56 | 8 | 9 | 11 | 13 |
| 57 | 7 | 9 | 11 | 12 |

TABLE 1-continued

| | (Range >> 6)&3 Sets | | | |
|---|---|---|---|---|
| | 0 | 1 | 2 | 3 |
| | Range Min | | | |
| | 256 | 320 | 384 | 448 |
| | Range Max | | | |
| State | 319 | 383 | 447 | 510 |
| | Range LPS | | | |
| 58 | 7 | 9 | 10 | 12 |
| 59 | 7 | 8 | 10 | 11 |
| 60 | 6 | 8 | 9 | 11 |
| 61 | 6 | 7 | 9 | 10 |
| 62 | 6 | 7 | 8 | 9 |
| 63 | 2 | 2 | 2 | 2 |

In Table 1, ">>" represents the right shift operation. In JCTVC-F254 (Alshin et al., *Multi-parameter probability up-date for CABAC*, Joint Collaborative Team on Video Coding (JCT-VC) of ITU-T SG16 WP3 and ISO/IEC JTC1/SC29/WG11, 6th Meeting: Torino, IT, 14-22 July, 2011, Document: JCTVC-F254), Alshin, et al., disclose a multi-parameter probability update for the CABAC of the HEVC standard. The parameter $N=1/(1-\alpha)$ is an approximate measurement for number of previously encoded bins (i.e., "window size") that have significant influence on the current bin. The choice of parameter N determines sensitivity of the model. A sensitive system will react to real changing quickly. On the other hand, a less sensitive model will not react to noise and random errors. Both properties are useful but contradictory. Accordingly, Alshin, et al., disclose a method to calculate several values with different a, simultaneously:

$$p_{i\_new}=(1-\alpha_i)\cdot y+\alpha_i\cdot p_{old} \quad (7)$$

and use weighted average as next bin probability prediction:

$$p_{new}=\Sigma(\beta_i\cdot p_{i\_new}), \quad (8)$$

where $\beta_i$ is a weighting factor associated with α.

Instead of state transition lookup tables (m_aucNextStateMPS and m_aucNextStateLPS) utilized in CABAC of the AVC standard for updating the state and its corresponding probability, Alshin, et al., use the explicit calculation with multiplication free formula for probability update. Assuming that probability $p_i$ is represented by integer number $P_i$ from 0 to $2^k$ (i.e., $p_i=P_i/2^k$) and α is represented by 1 over a power of two number (i.e., $\alpha=½^{Mi}$), multiplication free formula for probability update can be derived as follows:

$$P_i=(Y>>M_i)+P-(P_i>>M_i). \quad (9)$$

This formula predicts probability that next bin will be "1", where $Y=2^k$ if the last coding bin is "1", $Y=0$ if the last coding bin is "0", and ">>$M_i$" corresponds to the right shift by $M_i$ bits operation.

To keep balance between complexity increase and performance improvement, it is considered that linear combination for probability estimation consists of only two parameters:

$$P_0=(Y>>4)+P_0-(P_0>>4), \quad (10)$$

$$P_1=(Y>>7)+P_1-(P_0>>7), \text{ and} \quad (11)$$

$$P=(P_0+P_1+1)>>1. \quad (12)$$

Floating point value that corresponds to probability for AVC CABAC is always less than or equal to ½. If the probability exceeds this limit, LPS becomes MPS to keep probability inside interval mentioned above. It needs MPS/LPS switching when the probability of MPS/LPS is larger than 0.5. Alshin, et al., proposed to increase permissible level of probability (in terms of float-point values) up to 1 to avoid MPS/LPS switching. Therefore, one lookup table (LUT) for storing RangeOne or RangeZero is derived.

In VCEG-AZ07 (Chen, et al., "Further improvements to HMKTA-1.0", ITU-T Video Coding Experts Group (VCEG) meeting, Warsaw, Poland, IT, 19-26 Jun. 2015, Document: VCEG-AZ07), Chen, et al., proposed to use a single parameter CABAC. The probability derivation is the same as JCTVC-F254, which uses eq. (9) to derive the probability of being one or zero. For each context, only one updating speed is used, which means for each context, only one N is used. However, different contexts can use different N's. The range for N is from 4 to 7, and a 2-bit variable is used to indicate the probability updating speed for a specific context model. The N value is determined at the encoder side and signalled in the bitstream.

In JCTVC-F254 and VCEG-AZ07, the LUT of RangeOne or RangeZero is a 64-column by 512-row table. The input of the LUT is current range and the current probability. The valid range of the current range is from 256 to 510. The current range is divided into 64 sections, where each section contains 4 values of current range (e.g. 256 to 259, 260 to 263, etc.). The section index of range can be derived by:

$$rangeIdx = (range >> 2) - 64, \text{ or} \quad (13)$$

$$rangeIdx = (range >> 2) \& 63 \quad (14)$$

The valid range of the current probability (P) is from 0 to $2^k - 1$. In JCTVC-F254 and VCEG-AZ07, the k is 15. The current probability is divided into 512 sections, where each section contains 64 values of current probability (e.g. 0 to 63, 64 to 127, etc.). The section index of probability can be derived by $$probIdx = (P >> 6). \quad (15)$$

The RangeOne value can be derived by table lookup, for example $$RangeOne = tableRangeOne[rangeIdx][probIdx] \quad (16)$$

In JCTVC-F254 and VCEG-AZ07, the table size of the tableRangeOne table is 512 rows×64 columns×9-bits. The tableRangeOne covers the probability from 0.0 to 1.0. The size of lookup tables becomes very large. It requires 294912 bits of memory. It is desirable to overcome the issue without degrading the coding performance or increasing the computational complexity noticeably.

BRIEF SUMMARY OF THE INVENTION

A method and apparatus of entropy coding of coding symbols using Context-Based Adaptive Binary Arithmetic Coder (CABAC) are disclosed. According to the present invention, context-adaptive arithmetic encoding or decoding is applied to a current bin of a binary data of a current coding symbol according to a current probability for a binary value of the current bin and a current range associated with a current state of the context-adaptive arithmetic encoding or decoding, where the current probability is generated according to one or more previously coded symbols before the current coding symbol. An LPS probability index corresponding to an inverted current probability or the current probability is derived depending on whether the current probability for the binary value of the current bin is greater than 0.5. A range index is derived for identifying one range interval containing the current range. An LPS range is derived either using one or more mathematical operations comprising calculating a multiplication of a first value related to (2*the LPS probability index+1) or the LPS probability index and a second value related to (2*the range index+1) or the range index, or using a look-up-table to derive the LPS range, the look-up-table includes table contents corresponding to values of LPS range associated with a set of LPS probability indexes and a set of range indexes for encoding or decoding a binary value of the current bin, where the range index corresponds to a result of right-shifting the current range by mm and mm is a non-negative integer and each value of LPS range corresponds to one product of (2*one LPS probability index+1) and (2*one shifted range index+1) or corresponds to a offset and one product of one LPS probability index and one range index.

In one embodiment, when the current probability for the binary value of the current bin is greater than 0.5, an LPS (least-probably-symbol) probability is set equal to (1−the current probability) and otherwise, the LPS probability is set equal to the current probability. The LPS probability index is determined based on a target index indicating one probability interval containing the current probability or the LPS probability.

In another embodiment, when the current probability for the binary value of the current bin is greater than $2^{k-1}$ or is greater than or equal to $2^{k-1}$, an LPS probability is set equal to $(2^k - 1 - \text{the current probability})$ and the LPS probability index is set equal to $(2^{n+1} - 1)$ minus a result of right-shifting the current probability by (k−n−1) bits. Otherwise, the LPS probability is set equal to the current probability and the LPS probability index is set equal to the result of right-shifting the current probability by (k−n−1) bits, where the current probability is represented by k-bit values, and n and k are positive integers. The LPS range can be derived by multiplying (2*the LPS probability index+1) with (2*the range index+1) to obtain a multiplication result, and right-shifting the multiplication result by x bits and x is a positive integer. For example, k can be equal to 15, n can be equal to 5 and x can be equal to 3. In another example, the LPS range can be derived by multiplying the LPS probability index with the range index to obtain a multiplication result, and right-shifting the multiplication result by x bits plus an offset and x is a positive integer and the offset is an integer. For example, k can be equal to 15, n can be equal to 5, x can be equal to 1 and the offset can be equal to 2, 3, or 4.

The look-up-table may correspond to a two-dimensional table with the LPS probability index as a first table index in a first dimension and a clipped range index as a second table index in a second dimension, where the clipped range index corresponding to the range index. For example, the LPS probability index may have a first value range from 0 to 31, the clipped range index may have a second value range from 0 to 7 and the LPS range may have a third value range from greater than or equal to 0 to smaller than or equal to 255.

In one embodiment, the LPS probability is set equal to a result of bitwise exclusive or (XOR) for a value of (current probability >>(k−1)) and the current probability, or the LPS probability index is set equal to the result of bitwise exclusive or for the value of (current probability >>(k−1)) and the value of (current probability >>(k−n−1)), where the current probability is represented by k-bit values, and n and k are positive integers.

The method may further comprise deriving, from the current range, a rangeOne value and a rangeZero value for the current bin having a value of one and a value of zero respectively, wherein if the current probability for the binary value of the current bin is greater than 0.5 or is greater than or equal to 0.5, the rangeOne value is set to (the current range−the LPS range) and the rangeZero value is set to the LPS range; and otherwise, the rangeZero value is set to (the current range−the LPS range) and the rangeOne value is set to the LPS range.

DETAILED DESCRIPTION OF THE INVENTION

Figure 1A:
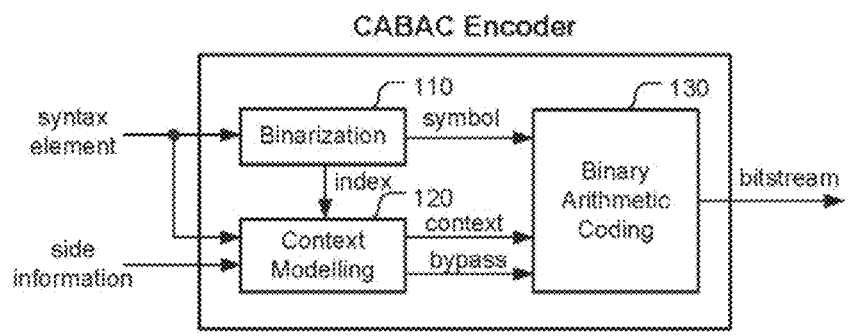
FIGS. 1(a) and 1(b) illustrate a basic structure of context-based adaptive binary arithmetic coding (CABAC) encoder and decoder.
Figure 1B:
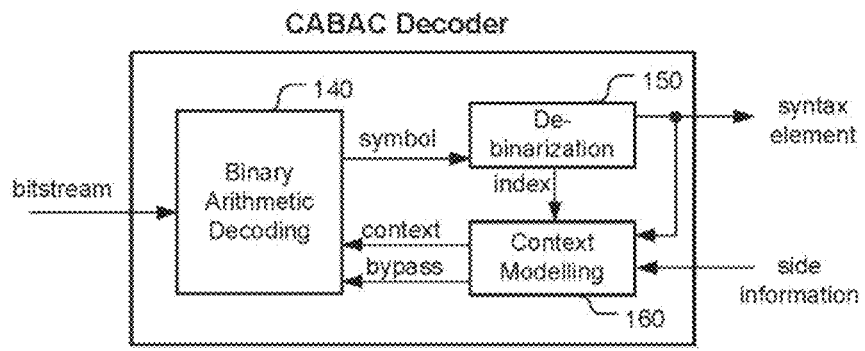
Figure 2:
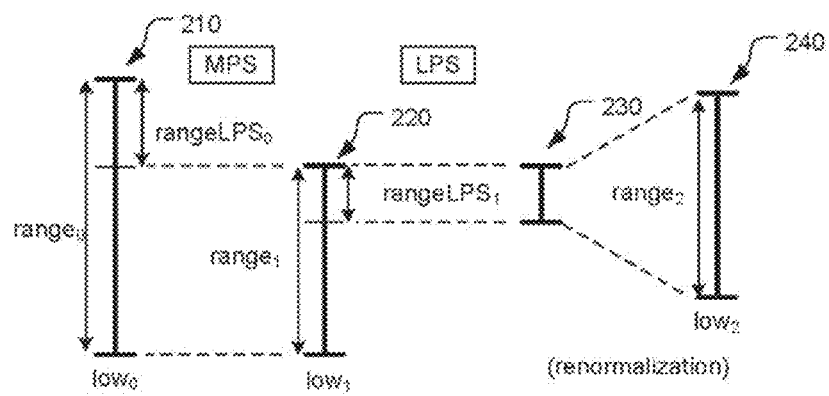
FIG. 2 illustrates a concept of the binary arithmetic coding, where initially, the probability range (i.e., range$_0$) is 1 and the low boundary (i.e., low$_0$) is 0 as indicated by a probability scale.

The following description is of the best-contemplated mode of carrying out the invention. This description is made for the purpose of illustrating the general principles of the invention and should not be taken in a limiting sense. The scope of the invention is best determined by reference to the appended claims.

In JCTVC-F254 and VCEG-AZ07, the rangeOne table covers the probability from 0.0 to 1.0. The LUT of JCTVC-F254 is 144 times of the LUT of HEVC, which is too large to be implemented in terms of hardware cost. Moreover, since the entry value of the RangeOne or RangeZero is derived from the MinRange (i.e., eq. 17), the coding efficiency will be dropped dramatically if a down-sampled LUT is used.

BAC Parameter Initialization

The multi-parameter CABAC disclosed in JCTVC-F254 can improve the coding efficiency of the entropy coding. However, the parameters are fixed as 4 and 7 in eq. (10) and (11). In VCEG-AZ07, the parameter is signalled to fit the probability transition of a target context for target syntax. However, the best parameters might be different for different contexts and also might be different for different slice and different QP. Therefore, method to set the different parameters for different contexts for different QP or different slice is disclosed in the present invention.

The multi-parameter CABAC can be re-formulated as eq. (19) to (21).

$$P_0 = (Y \!>\!> \alpha) + P_0 - (P_0 \!>\!> \alpha) \text{ or } P_0 = P_0 + ((Y - P_0) \!>\!> \alpha), \quad (19)$$

$$P_1 = (Y \!>\!> \beta) + P_1 - (P_1 \!>\!> \beta) \text{ or } P_1 = P_1 + ((Y - P_1) \!>\!> \beta), \quad (20)$$

$$P = (P_0 + P_1 + 1) \!>\!> 1 \quad (21)$$

For different contexts in different QP, the α and β can be different. The α and β can be initialized at context initial process, which is at the beginning of encoding/decoding a slice. The α and β can be derived by a predefined equation and one or more initial values. The initial values can be predefined in the standard. In this invention, some parameter initial methods are proposed.

Method-1: Separate Equation $$\alpha = ((m0*QP + n0) \!>\!> o0) + ((p0*q0) \!>\!> r0) + s0 \quad (22)$$

$$\beta = ((m1*QP + n1) \!>\!> o1) + ((p1*q1) \!>\!> r1) + s1 \quad (23)$$

In the above equations, the QP is the slice QP, the m0, n0, o0, p0, q0, r0, s0, m1, n1, o1, p1, q1, r1, and s1 are integer values. Note that, if a variable Y is a negative value, the (X>>Y) means (X<<(−Y)). If the derived α or β is not an integer value, it will be rounded to an integer value. Also, the derived α or β will be clipped within a predefined range.

In one embodiment, the m0, p0, m1, p1 are stored as the initial values for different contexts while the n0, o0, q0, r0, s0, n1, o1, q1, r1, and s1 are fixed values and can be 0.

Method-2: α and Delta Value $$\alpha = ((m0*QP + n0) \!>\!> o0) + ((p0*q0) \!>\!> r0) + s0 \quad (24)$$

$$\text{delta} = ((m1*QP + n1) \!>\!> o1) + ((p1*q1) \!>\!> r1) + s1 \quad (25)$$

$$\beta = \alpha + \text{delta} \quad (26)$$

In one embodiment, the QP is the slice QP, the m0, n0, o0, p0, q0, r0, s0, m1, n1, o1, p1, q1, r1, and s1 are the integer values. Note that, if a variable Y is a negative value, the (X>>Y) means (X<<(−Y)). If the derived α, β, or delta is not a integer value, it will be rounded to an integer value. Also, the derived α or β will be clipped within a predefined range.

In one embodiment, the m0, p0, m1, p1 are stored as the initial values for different contexts while the n0, o0, q0, r0, s0, n1, o1, q1, r1, and s1 are fixed values and can be 0. In another embodiment, the m0, p0, m1 are stored as the initial values for different contexts while the n0, o0, q0, r0, s0, n1, o1, p1, q1, r1, and s1 are fixed values and can be 0. In yet another embodiment, the m0, p0, p1 are stored as the initial values for different contexts while the n0, o0, q0, r0, s0, m1, n1, o1, q1, r1, and s1 are fixed values and can be 0.

Method-3: Pair Index

The combination of the α and β can be categorized into several parameter pairs. An index is assigned for a parameter pair. The selected pair index can be derived by a predefined equation and one or more initial values. For example, if range of α and β are within 3 to 8, there are 15 pairs corresponding to:

1: [3, 4], #2: [3, 5], #3: [3, 6], #4: [3, 7], #5: [3, 8], #6: [4, 5], #7: [4, 6], #8: [4, 7], #9: [4, 8], #10: [5, 6], #11: [5, 7], #12: [5, 8], #13: [6, 7], #14: [6, 8], #15: [7, 8]

or

1: [3, 4], #2: [4, 5], #3: [5, 6], #4: [6, 7], #5: [7, 8], #6: [3, 5], #7: [4, 6], #8: [5, 7], #9: [6, 8], #10: [3, 6], #11: [4, 7], #12: [5, 8], #13: [3, 7], #14: [4, 8], #15: [3, 8].

The selected pair index can be derived as:

$$\text{index} = ((m0*QP + n0) \!>\!> o0) + ((p0*q0) \!>\!> r0) + s0 \quad (27)$$

In the above equation, the QP is the slice QP, the m0, n0, o0, p0, q0, r0, and s0 are the integer values. Note that, if a variable Y is a negative value, the (X>>Y) means (X<<(−Y)). If the derived index is not a integer value, it will be rounded to an integer value.

In one embodiment, the m0, and p0 are stored as the initial values for different contexts while the n0, o0, q0, r0, s0 are fixed values and can be 0.

In the above method, the multiple initial values can be packed into one initial value. For example, in method-2, the m0, p0, m1, p1 can be packed into one initial value.

In the above method, for a context, the initial values can be different in different slice or the same for different slice. For example, one initial value or value set for I-slice, one initial value or value set for P-slice, one initial value or value set for B-slice. in another example, one initial value or value set for I-slice, one initial value or value set for P-slice and B-slice.

RangeLPS Derivation

In CABAC encoder and decoder, a recursive interval-subdividing procedure is performed in binary arithmetic encoding unit 130 and binary arithmetic decoding unit 140. In the interval-subdividing, a value of rangeLPS, rangeOne, or rangeZero is derived. In JCTVC-F254 and VCEG-AZ07, the rangeOne is derived from table look up. The rangeOne table covers the probability from 0.0 to 1.0. However, it makes the LUT too large to be implemented in terms of hardware cost. The LUT is 144 times of the LUT of HEVC. Moreover, because the entry value of the RangeOne or RangeZero is derived from the MinRange (i.e., eq. (17)), the coding efficiency will dropped dramatically if the down-sampled LUT is used.

Therefore, it is proposed to store the probability range from 0.0 to 0.5 only in the present invention. The values in the other half table can be derived by using "range−rangeLPS". The number of rows defines the resolution of the probabilities. For example, we can design a rangeLPS table with 64 rows for probability range equal to 0.5 to 0.0. Each row represents the rangeLPS for a probability range of 1/64. The value of rangeLPS is derived by (range A)*(Prob B). For example, Table 2 shows a rangeLPS table with 4 columns and 64 rows. The first row represents the rangeLPS for probability within 63/128 to 64/128 in four different range sections. In Table 2, the range A is range Mid and Prob B is Prob Max. The value of rangeLPS is derived by (range Mid)*(Prob Max). In JCTVC-F254 and VCEG-AZ07, for Table 2, if the probability of one is larger than 0.5 (e.g. 0.64), it means that the probability of zero is 0.36. The 0.36 (in 18$^{th}$ row) will be used to find the range for rangeZero. The rangeOne can be derived by (range−rangeZero).

TABLE 2 rangeLPS table for a certain probability with (range Mid) * (Prob Max)

| | | | (Range >> 6)&3 rangeIdx | | | |
|---|---|---|---|---|---|---|
| | | | 0 | 1 | 2 | 3 |
| | | | range Min | | | |
| | | | 256 | 320 | 384 | 448 |
| | | | range Max | | | |
| | | | 319 | 383 | 447 | 511 |
| Prob | Prob | | range Mid | | | |
| Max | Min | probIdx | 288 | 352 | 416 | 480 |
| 64/128 | 63/128 | 63 | 144 | 176 | 208 | 240 |
| 63/128 | 62/128 | 62 | 142 | 173 | 205 | 236 |
| 62/128 | 61/128 | 61 | 140 | 171 | 202 | 233 |
| 61/128 | 60/128 | 60 | 137 | 168 | 198 | 229 |
| 60/128 | 59/128 | 59 | 135 | 165 | 195 | 225 |
| 59/128 | 58/128 | 58 | 133 | 162 | 192 | 221 |

TABLE 2-continued rangeLPS table for a certain probability with (range Mid) * (Prob Max)

| | | | (Range >> 6)&3 rangeIdx | | | |
|---|---|---|---|---|---|---|
| | | | 0 | 1 | 2 | 3 |
| | | | range Min | | | |
| | | | 256 | 320 | 384 | 448 |
| | | | range Max | | | |
| | | | 319 | 383 | 447 | 511 |
| Prob | Prob | | range Mid | | | |
| Max | Min | probIdx | 288 | 352 | 416 | 480 |
| 58/128 | 57/128 | 57 | 131 | 160 | 189 | 218 |
| 57/128 | 56/128 | 56 | 128 | 157 | 185 | 214 |
| 56/128 | 55/128 | 55 | 126 | 154 | 182 | 210 |
| 55/128 | 54/128 | 54 | 124 | 151 | 179 | 206 |
| 54/128 | 53/128 | 53 | 122 | 149 | 176 | 203 |
| 53/128 | 52/128 | 52 | 119 | 146 | 172 | 199 |
| 52/128 | 51/128 | 51 | 117 | 143 | 169 | 195 |
| 51/128 | 50/128 | 50 | 115 | 140 | 166 | 191 |
| 50/128 | 49/128 | 49 | 113 | 138 | 163 | 188 |
| 49/128 | 48/128 | 48 | 110 | 135 | 159 | 184 |
| 48/128 | 47/128 | 47 | 108 | 132 | 156 | 180 |
| 47/128 | 46/128 | 46 | 106 | 129 | 153 | 176 |
| 46/128 | 45/128 | 45 | 104 | 127 | 150 | 173 |
| 45/128 | 44/128 | 44 | 101 | 124 | 146 | 169 |
| 44/128 | 43/128 | 43 | 99 | 121 | 143 | 165 |
| 43/128 | 42/128 | 42 | 97 | 118 | 140 | 161 |
| 42/128 | 41/128 | 41 | 95 | 116 | 137 | 158 |
| 41/128 | 40/128 | 40 | 92 | 113 | 133 | 154 |
| 40/128 | 39/128 | 39 | 90 | 110 | 130 | 150 |
| 39/128 | 38/128 | 38 | 88 | 107 | 127 | 146 |
| 38/128 | 37/128 | 37 | 86 | 105 | 124 | 143 |
| 37/128 | 36/128 | 36 | 83 | 102 | 120 | 139 |
| 36/128 | 35/128 | 35 | 81 | 99 | 117 | 135 |
| 35/128 | 34/128 | 34 | 79 | 96 | 114 | 131 |
| 34/128 | 33/128 | 33 | 77 | 94 | 111 | 128 |
| 33/128 | 32/128 | 32 | 74 | 91 | 107 | 124 |
| 32/128 | 31/128 | 31 | 72 | 88 | 104 | 120 |
| 31/128 | 30/128 | 30 | 70 | 85 | 101 | 116 |
| 30/128 | 29/128 | 29 | 68 | 83 | 98 | 113 |
| 29/128 | 28/128 | 28 | 65 | 80 | 94 | 109 |
| 28/128 | 27/128 | 27 | 63 | 77 | 91 | 105 |
| 27/128 | 26/128 | 26 | 61 | 74 | 88 | 101 |
| 26/128 | 25/128 | 25 | 59 | 72 | 85 | 98 |
| 25/128 | 24/128 | 24 | 56 | 69 | 81 | 94 |
| 24/128 | 23/128 | 23 | 54 | 66 | 78 | 90 |
| 23/128 | 22/128 | 22 | 52 | 63 | 75 | 86 |
| 22/128 | 21/128 | 21 | 50 | 61 | 72 | 83 |
| 21/128 | 20/128 | 20 | 47 | 58 | 68 | 79 |
| 20/128 | 19/128 | 19 | 45 | 55 | 65 | 75 |
| 19/128 | 18/128 | 18 | 43 | 52 | 62 | 71 |
| 18/128 | 17/128 | 17 | 41 | 50 | 59 | 68 |
| 17/128 | 16/128 | 16 | 38 | 47 | 55 | 64 |
| 16/128 | 15/128 | 15 | 36 | 44 | 52 | 60 |
| 15/128 | 14/128 | 14 | 34 | 41 | 49 | 56 |
| 14/128 | 13/128 | 13 | 32 | 39 | 46 | 53 |
| 13/128 | 12/128 | 12 | 29 | 36 | 42 | 49 |
| 12/128 | 11/128 | 11 | 27 | 33 | 39 | 45 |
| 11/128 | 10/128 | 10 | 25 | 30 | 36 | 41 |
| 10/128 | 09/128 | 9 | 23 | 28 | 33 | 38 |
| 09/128 | 08/128 | 8 | 20 | 25 | 29 | 34 |
| 08/128 | 07/128 | 7 | 18 | 22 | 26 | 30 |
| 07/128 | 06/128 | 6 | 16 | 19 | 23 | 26 |

TABLE 2-continued rangeLPS table for a certain probability with (range Mid) * (Prob Max)

| Prob Max | Prob Min | probIdx | (Range >> 6)&3 rangeIdx 0 range Min 256 range Max 319 range Mid 288 | 1 320 383 352 | 2 384 447 416 | 3 448 511 480 |
|---|---|---|---|---|---|---|
| 06/128 | 05/128 | 5 | 14 | 17 | 20 | 23 |
| 05/128 | 04/128 | 4 | 11 | 14 | 16 | 19 |
| 04/128 | 03/128 | 3 | 9 | 11 | 13 | 15 |
| 03/128 | 02/128 | 2 | 7 | 8 | 10 | 11 |
| 02/128 | 01/128 | 1 | 5 | 6 | 7 | 8 |
| 01/128 | 00/128 | 0 | 2 | 3 | 3 | 4 |

Table 3 shows another value derivation method that rangeLPS is derived by (range Mid)*(Prob Mid) with a 32×8 table. The column and row index of Table 3 can be (Range>>5)&7 and (Prob>>9) respectively, where the probability is represented by 15-bit values. If the (Prob>>9) is larger than 31, the value of (63−(Prob>>9)) is used to represent the column index (the probIdx) for table look up. For example, if the Prob corresponds to the probability of a bin value equal to one, the probability is represented by a 15-bit value, and if (Prob>>9) is smaller than 32, the (Range>>5)&7 and (Prob>>9) are used for table look up. The derived value is the rangeOne and the rangeZero is derived as (range−rangeOne). If (Prob>>9) is equal to or larger than 32 (i.e., the Prob≥16384), the (Range>>5)&7 and (63−(Prob>>9)) (i.e., (32767−P)>>9) are used for table look up. The derived value is the rangeZero and the rangeOne is derived from (range−rangeZero).

TABLE 3 rangeLPS table for a certain probability with (range Mid) * (Prob Mid)

| Prob Max | Prob Mid | Prob Min | probIdx (Prob >> 9) | (Range >> 5)&7 rangeIdx 0 range Min 256 range Max 287 range Mid 272 | 1 288 319 304 | 2 320 351 336 | 3 352 383 368 | 4 384 415 400 | 5 416 447 432 | 6 448 479 464 | 7 480 511 496 |
|---|---|---|---|---|---|---|---|---|---|---|---|
| 32/64 | 31.5/64 | 31/64 | 31 | 134 | 150 | 165 | 181 | 197 | 213 | 228 | 244 |
| 31/64 | 30.5/64 | 30/64 | 30 | 130 | 145 | 160 | 175 | 191 | 206 | 221 | 236 |
| 30/64 | 29.5/64 | 29/64 | 29 | 125 | 140 | 155 | 170 | 184 | 199 | 214 | 229 |
| 29/64 | 28.5/64 | 28/64 | 28 | 121 | 135 | 150 | 164 | 178 | 192 | 207 | 221 |
| 28/64 | 27.5/64 | 27/64 | 27 | 117 | 131 | 144 | 158 | 172 | 186 | 199 | 213 |
| 27/64 | 26.5/64 | 26/64 | 26 | 113 | 126 | 139 | 152 | 166 | 179 | 192 | 205 |
| 26/64 | 25.5/64 | 25/64 | 25 | 108 | 121 | 134 | 147 | 159 | 172 | 185 | 198 |
| 25/64 | 24.5/64 | 24/64 | 24 | 104 | 116 | 129 | 141 | 153 | 165 | 178 | 190 |
| 24/64 | 23.5/64 | 23/64 | 23 | 100 | 112 | 123 | 135 | 147 | 159 | 170 | 182 |
| 23/64 | 22.5/64 | 22/64 | 22 | 96 | 107 | 118 | 129 | 141 | 152 | 163 | 174 |
| 22/64 | 21.5/64 | 21/64 | 21 | 91 | 102 | 113 | 124 | 134 | 145 | 156 | 167 |
| 21/64 | 20.5/64 | 20/64 | 20 | 87 | 97 | 108 | 118 | 128 | 138 | 149 | 159 |
| 20/64 | 19.5/64 | 19/64 | 19 | 83 | 93 | 102 | 112 | 122 | 132 | 141 | 151 |
| 19/64 | 18.5/64 | 18/64 | 18 | 79 | 88 | 97 | 106 | 116 | 125 | 134 | 143 |
| 18/64 | 17.5/64 | 17/64 | 17 | 74 | 83 | 92 | 101 | 109 | 118 | 127 | 136 |
| 17/64 | 16.5/64 | 16/64 | 16 | 70 | 78 | 87 | 95 | 103 | 111 | 120 | 128 |
| 16/64 | 15.5/64 | 15/64 | 15 | 66 | 74 | 81 | 89 | 97 | 105 | 112 | 120 |
| 15/64 | 14.5/64 | 14/64 | 14 | 62 | 69 | 76 | 83 | 91 | 98 | 105 | 112 |
| 14/64 | 13.5/64 | 13/64 | 13 | 57 | 64 | 71 | 78 | 84 | 91 | 98 | 105 |
| 13/64 | 12.5/64 | 12/64 | 12 | 53 | 59 | 66 | 72 | 78 | 84 | 91 | 97 |
| 12/64 | 11.5/64 | 11/64 | 11 | 49 | 55 | 60 | 66 | 72 | 78 | 83 | 89 |
| 11/64 | 10.5/64 | 10/64 | 10 | 45 | 50 | 55 | 60 | 66 | 71 | 76 | 81 |
| 10/64 | 09.5/64 | 09/64 | 9 | 40 | 45 | 50 | 55 | 59 | 64 | 69 | 74 |
| 09/64 | 08.5/64 | 08/64 | 8 | 36 | 40 | 45 | 49 | 53 | 57 | 62 | 66 |
| 08/64 | 07.5/64 | 07/64 | 7 | 32 | 36 | 39 | 43 | 47 | 51 | 54 | 58 |
| 07/64 | 06.5/64 | 06/64 | 6 | 28 | 31 | 34 | 37 | 41 | 44 | 47 | 50 |
| 06/64 | 05.5/64 | 05/64 | 5 | 23 | 26 | 29 | 32 | 34 | 37 | 40 | 43 |
| 05/64 | 04.5/64 | 04/64 | 4 | 19 | 21 | 24 | 26 | 28 | 30 | 33 | 35 |
| 04/64 | 03.5/64 | 03/64 | 3 | 15 | 17 | 18 | 20 | 22 | 24 | 25 | 27 |
| 03/64 | 02.5/64 | 02/64 | 2 | 11 | 12 | 13 | 14 | 16 | 17 | 18 | 19 |
| 02/64 | 01.5/64 | 01/64 | 1 | 6 | 7 | 8 | 9 | 9 | 10 | 11 | 12 |
| 01/64 | 00.5/64 | 00/64 | 0 | 2 | 2 | 3 | 3 | 3 | 3 | 4 | 4 |

The Table can be also derived by using (range Min)*(Prob Max) as shown in Table 4.

TABLE 4 rangeLPS table for a certain probability with (range Min) * (Prob Max)

| Prob Max | Prob Mid | Prob Min | probIdx (Prob >> 9) | (Range >> 5)&7 rangeIdx | | | | | | | |
|---|---|---|---|---|---|---|---|---|---|---|---|
| | | | | 0 | 1 | 2 | 3 | 4 | 5 | 6 | 7 |
| | | | | | | | range Min | | | | |
| | | | | 256 | 288 | 320 | 352 | 384 | 416 | 448 | 480 |
| | | | | | | | range Max | | | | |
| | | | | 287 | 319 | 351 | 383 | 415 | 447 | 479 | 511 |
| | | | | | | | range Mid | | | | |
| | | | | 272 | 304 | 336 | 368 | 400 | 432 | 464 | 496 |
| 32/64 | 31.5/64 | 31/64 | 31 | 128 | 144 | 160 | 176 | 192 | 208 | 224 | 240 |
| 31/64 | 30.5/64 | 30/64 | 30 | 124 | 140 | 155 | 171 | 186 | 202 | 217 | 233 |
| 30/64 | 29.5/64 | 29/64 | 29 | 120 | 135 | 150 | 165 | 180 | 195 | 210 | 225 |
| 29/64 | 28.5/64 | 28/64 | 28 | 116 | 131 | 145 | 160 | 174 | 189 | 203 | 218 |
| 28/64 | 27.5/64 | 27/64 | 27 | 112 | 126 | 140 | 154 | 168 | 182 | 196 | 210 |
| 27/64 | 26.5/64 | 26/64 | 26 | 108 | 122 | 135 | 149 | 162 | 176 | 189 | 203 |
| 26/64 | 25.5/64 | 25/64 | 25 | 104 | 117 | 130 | 143 | 156 | 169 | 182 | 195 |
| 25/64 | 24.5/64 | 24/64 | 24 | 100 | 113 | 125 | 138 | 150 | 163 | 175 | 188 |
| 24/64 | 23.5/64 | 23/64 | 23 | 96 | 108 | 120 | 132 | 144 | 156 | 168 | 180 |
| 23/64 | 22.5/64 | 22/64 | 22 | 92 | 104 | 115 | 127 | 138 | 150 | 161 | 173 |
| 22/64 | 21.5/64 | 21/64 | 21 | 88 | 99 | 110 | 121 | 132 | 143 | 154 | 165 |
| 21/64 | 20.5/64 | 20/64 | 20 | 84 | 95 | 105 | 116 | 126 | 137 | 147 | 158 |
| 20/64 | 19.5/64 | 19/64 | 19 | 80 | 90 | 100 | 110 | 120 | 130 | 140 | 150 |
| 19/64 | 18.5/64 | 18/64 | 18 | 76 | 86 | 95 | 105 | 114 | 124 | 133 | 143 |
| 18/64 | 17.5/64 | 17/64 | 17 | 72 | 81 | 90 | 99 | 108 | 117 | 126 | 135 |
| 17/64 | 16.5/64 | 16/64 | 16 | 68 | 77 | 85 | 94 | 102 | 111 | 119 | 128 |
| 16/64 | 15.5/64 | 15/64 | 15 | 64 | 72 | 80 | 88 | 96 | 104 | 112 | 120 |
| 15/64 | 14.5/64 | 14/64 | 14 | 60 | 68 | 75 | 83 | 90 | 98 | 105 | 113 |
| 14/64 | 13.5/64 | 13/64 | 13 | 56 | 63 | 70 | 77 | 84 | 91 | 98 | 105 |
| 13/64 | 12.5/64 | 12/64 | 12 | 52 | 59 | 65 | 72 | 78 | 85 | 91 | 98 |
| 12/64 | 11.5/64 | 11/64 | 11 | 48 | 54 | 60 | 66 | 72 | 78 | 84 | 90 |
| 11/64 | 10.5/64 | 10/64 | 10 | 44 | 50 | 55 | 61 | 66 | 72 | 77 | 83 |
| 10/64 | 09.5/64 | 09/64 | 9 | 40 | 45 | 50 | 55 | 60 | 65 | 70 | 75 |
| 09/64 | 08.5/64 | 08/64 | 8 | 36 | 41 | 45 | 50 | 54 | 59 | 63 | 68 |
| 08/64 | 07.5/64 | 07/64 | 7 | 32 | 36 | 40 | 44 | 48 | 52 | 56 | 60 |
| 07/64 | 06.5/64 | 06/64 | 6 | 28 | 32 | 35 | 39 | 42 | 46 | 49 | 53 |
| 06/64 | 05.5/64 | 05/64 | 5 | 24 | 27 | 30 | 33 | 36 | 39 | 42 | 45 |
| 05/64 | 04.5/64 | 04/64 | 4 | 20 | 23 | 25 | 28 | 30 | 33 | 35 | 38 |
| 04/64 | 03.5/64 | 03/64 | 3 | 16 | 18 | 20 | 22 | 24 | 26 | 28 | 30 |
| 03/64 | 02.5/64 | 02/64 | 2 | 12 | 14 | 15 | 17 | 18 | 20 | 21 | 23 |
| 02/64 | 01.5/64 | 01/64 | 1 | 8 | 9 | 10 | 11 | 12 | 13 | 14 | 15 |
| 01/64 | 00.5/64 | 00/64 | 0 | 4 | 5 | 5 | 6 | 6 | 7 | 7 | 8 |

In one embodiment to derive the RangeOne (or RangeZero), for a k-bit probability ($2^k > P > 0$) and a 9-bits range, the probLPS can be calculated according to probLPS=$(P>=2^{k-1})$? $2^k-1-P$: P. The probIdx can be derived as probLPS>>(k−n−1), where the rangeLPS table has $2^n$ rows. The rangeIdx is derived as (range>>(8−m))−(256>>m), ((range−256)>>(8−m)), or (range>>(8−m))&($2^m-1$), where the rangeLPS table has $2^m$ columns. The rangeLPS can be calculated according to rangeLPS=rangeLPSTable[probIdx][rangeIdx]. If P is equal to or larger than $2^{k-1}$ (i.e., the k-th bit of P equal to 1), the rangeOne and rangeZero can be calculated according to rangeOne=range−rangeLPS and rangeZero=rangeLPS respectively. Otherwise (i.e., P smaller than $2^{k-1}$), the rangeOne and rangeZero can be calculated according to rangeOne=rangeLPS and rangeZero=range−rangeLPS respectively.

In the example of JCTVC-F254 and VCEG-AZ07, k is 15, the probLPS, probIdx and rangeIdx can be calculated according to probLPS=(P>=16384)? 32767−P: P, probIdx=probLPS>>8, and rangeIdx=(range>>6)&3 respectively. If P is equal to or larger than 16384, the rangeOne and rangeZero can be calculated according to rangeOne=range−rangeLPS and rangeZero=rangeLPS respectively. Otherwise (i.e., P smaller than 16384), the rangeOne and rangeZero can be calculated according to rangeOne=rangeLPS and rangeZero=range−rangeLPS respectively.

The rangeLPS value can be derived by calculating (range Min)*(Prob Max), (range Min)*(Prob Mid), (range Min)* (Prob Min), (range Mid)*(Prob Max), (range Mid)*(Prob Mid), (range Mid)*(Prob Min), (range Max)*(Prob Max), (range Max)*(Prob Mid), or (range Max)*(Prob Min). The entire values in the rangeLPS table can be derived by using multiplier.

For example, if the rangeLPS table is derived by using (range Min)*(Prob Max), the entry value can be derived by using a formula. For example, for a k-bit probability ($2^k > P > 0$) with a 9-bits range, the probLPS can be calculated according to probLPS=$(P>=2^{k-1})$? $2^k-1-P$: P. The probIdx can be derived as probLPS>>(k−n−1). The rangeIdx is derived as (range>>(8−m)). The rangeLPS can be calculated according to rangeLPS=((probIdx+1)*rangeIdx)>>(k−n−m−6), ((probIdx)*rangeIdx+rangeIdx)>>(k−n−m−6), (((probIdx)*rangeIdx)>>(k−n−m−6))+((rangeIdx)>>(k−n− m−6)), or (((probIdx+offset1)*rangeIdx+offset2)>>(k−n−m−6))+offset3, where the offset1, offset2, and offset3 are integers. For example, the offset1 and the offset2 can be 0, the offset3 can be 2, 3, or 4.

In one example, k is 15 and if the n is 5 and m is 3, the probLPS, probIdx and rangeIdx can be calculated according to probLPS=(P>=16384)? 32767−P: P, probIdx=probLPS>>9, and rangeIdx=(range>>5) respectively. The rangeLPS can be calculated according to rangeLPS=((probIdx+1)*rangeIdx)>>1, or ((probIdx*rangeIdx)>>1)+(rangeIdx>>1), or ((probIdx*rangeIdx)>>1)+4. If P is equal to or larger than 16384, the rangeOne and rangeZero can be calculated according to rangeOne=range−rangeLPS and rangeZero=rangeLPS respectively. Otherwise (i.e., is smaller than 16384), the rangeOne and rangeZero can be calculated according to rangeOne=rangeLPS and rangeZero=range−rangeLPS respectively.

The value of rangeLPS can be pre-calculated and stored in a look-up table. For example, Table 4 is the result of "rangeLPS=((probIdx+1)*rangeIdx)>>1" by using probIdx and rangeIdx for table look-up. Table 5 is the result of "rangeLPS=((probIdx*rangeIdx)>>1)+(rangeIdx>>1)" by using probIdx and rangeIdx for table look-up.

In another embodiment, if the rangeLPS table is derived by using (range Min)*(Prob Max), the entry value can be derived by using a formula. For example, for a k-bit probability ($2^k$>P>0) and a 9-bits range, the probIdx can be calculated according to probIdx=(P>=$2^{k-1}$)? $2^{n+1}$−(P>>(k−n−1)): (P>>(k−n−1))+1. The rangeIdx is derived as (range>>(8−m)). The rangeLPS=(probIdx*rangeIdx)>>(k−n−m−6).

In the example of JCTVC-F254 and VCEG-AZ07, k is 15 and if the n is 5 and m is 3, the probIdx and rangeIdx can be calculated according to probIdx=(P>=16384)? 64−(P>>9): (P>>9)+1 and rangeIdx=(range>>5) respectively. The rangeLPS can be calculated according to rangeLPS=(probIdx*rangeIdx)>>1. If P is equal to or larger than 16384, the rangeOne and rangeZero can be calculated according to rangeOne=range−rangeLPS and rangeZero=rangeLPS respectively. Otherwise (P is smaller than 16384), the rangeOne and rangeZero can be calculated according to rangeOne=rangeLPS and rangeZero=range−rangeLPS respectively.

In another embodiment, if the rangeLPS table can be derived by using a formula. For example, for a k-bit probability ($2^k$>P>0) and a 9-bits range, the probIdx can be calculated according to probIdx=(P>=$2^{k-1}$)? $2^{n+1}$−(P>>(k−

TABLE 5 rangeLPS table for a certain probability with (range Min) * (Prob Max)

| Prob Max | Prob Mid | Prob Min | probIdx (Prob >> 9) | (Range >> 5)&7 rangeIdx | | | | | | | |
|---|---|---|---|---|---|---|---|---|---|---|---|
| | | | | 0 | 1 | 2 | 3 range Min | 4 | 5 | 6 | 7 |
| | | | | 256 | 288 | 320 | 352 | 384 range Max | 416 | 448 | 480 |
| | | | | 287 | 319 | 351 | 383 | 415 range Mid | 447 | 479 | 511 |
| | | | | 272 | 304 | 336 | 368 | 400 | 432 | 464 | 496 |
| 32/64 | 31.5/64 | 31/64 | 31 | 128 | 145 | 160 | 177 | 192 | 209 | 224 | 241 |
| 31/64 | 30.5/64 | 30/64 | 30 | 124 | 140 | 155 | 171 | 186 | 202 | 217 | 233 |
| 30/64 | 29.5/64 | 29/64 | 29 | 120 | 136 | 150 | 166 | 180 | 196 | 210 | 226 |
| 29/64 | 28.5/64 | 28/64 | 28 | 116 | 131 | 145 | 160 | 174 | 189 | 203 | 218 |
| 28/64 | 27.5/64 | 27/64 | 27 | 112 | 127 | 140 | 155 | 168 | 183 | 196 | 211 |
| 27/64 | 26.5/64 | 26/64 | 26 | 108 | 122 | 135 | 149 | 162 | 176 | 189 | 203 |
| 26/64 | 25.5/64 | 25/64 | 25 | 104 | 118 | 130 | 144 | 156 | 170 | 182 | 196 |
| 25/64 | 24.5/64 | 24/64 | 24 | 100 | 113 | 125 | 138 | 150 | 163 | 175 | 188 |
| 24/64 | 23.5/64 | 23/64 | 23 | 96 | 109 | 120 | 133 | 144 | 157 | 168 | 181 |
| 23/64 | 22.5/64 | 22/64 | 22 | 92 | 104 | 115 | 127 | 138 | 150 | 161 | 173 |
| 22/64 | 21.5/64 | 21/64 | 21 | 88 | 100 | 110 | 122 | 132 | 144 | 154 | 166 |
| 21/64 | 20.5/64 | 20/64 | 20 | 84 | 95 | 105 | 116 | 126 | 137 | 147 | 158 |
| 20/64 | 19.5/64 | 19/64 | 19 | 80 | 91 | 100 | 111 | 120 | 131 | 140 | 151 |
| 19/64 | 18.5/64 | 18/64 | 18 | 76 | 86 | 95 | 105 | 114 | 124 | 133 | 143 |
| 18/64 | 17.5/64 | 17/64 | 17 | 72 | 82 | 90 | 100 | 108 | 118 | 126 | 136 |
| 17/64 | 16.5/64 | 16/64 | 16 | 68 | 77 | 85 | 94 | 102 | 111 | 119 | 128 |
| 16/64 | 15.5/64 | 15/64 | 15 | 64 | 73 | 80 | 89 | 96 | 105 | 112 | 121 |
| 15/64 | 14.5/64 | 14/64 | 14 | 60 | 68 | 75 | 83 | 90 | 98 | 105 | 113 |
| 14/64 | 13.5/64 | 13/64 | 13 | 56 | 64 | 70 | 78 | 84 | 92 | 98 | 106 |
| 13/64 | 12.5/64 | 12/64 | 12 | 52 | 59 | 65 | 72 | 78 | 85 | 91 | 98 |
| 12/64 | 11.5/64 | 11/64 | 11 | 48 | 55 | 60 | 67 | 72 | 79 | 84 | 91 |
| 11/64 | 10.5/64 | 10/64 | 10 | 44 | 50 | 55 | 61 | 66 | 72 | 77 | 83 |
| 10/64 | 09.5/64 | 09/64 | 9 | 40 | 46 | 50 | 56 | 60 | 66 | 70 | 76 |
| 09/64 | 08.5/64 | 08/64 | 8 | 36 | 41 | 45 | 50 | 54 | 59 | 63 | 68 |
| 08/64 | 07.5/64 | 07/64 | 7 | 32 | 37 | 40 | 45 | 48 | 53 | 56 | 61 |
| 07/64 | 06.5/64 | 06/64 | 6 | 28 | 32 | 35 | 39 | 42 | 46 | 49 | 53 |
| 06/64 | 05.5/64 | 05/64 | 5 | 24 | 28 | 30 | 34 | 36 | 40 | 42 | 46 |
| 05/64 | 04.5/64 | 04/64 | 4 | 20 | 23 | 25 | 28 | 30 | 33 | 35 | 38 |
| 04/64 | 03.5/64 | 03/64 | 3 | 16 | 19 | 20 | 23 | 24 | 27 | 28 | 31 |
| 03/64 | 02.5/64 | 02/64 | 2 | 12 | 14 | 15 | 17 | 18 | 20 | 21 | 23 |
| 02/64 | 01.5/64 | 01/64 | 1 | 8 | 10 | 10 | 12 | 12 | 14 | 14 | 16 |
| 01/64 | 00.5/64 | 00/64 | 0 | 4 | 5 | 5 | 6 | 6 | 7 | 7 | 8 | n−1)): max(1,(P>>(k−n−1))), or probIdx=(P>=$2^{k-1}$)? $2^{n+1}$−(P>>(k−n−1))−1: max(1,(P>>(k−n−1))), where the rangeLPS table has $2^n$ rows. The rangeIdx is derived as (range>>(8−m)), where the rangeLPS table has $2^m$ columns. The rangeLPS can be calculated according to rangeLPS=(probIdx*rangeIdx)>>(k−n−m−6), where k can be 15, n can be 5, and m can be 3.

In another embodiment, if the rangeLPS table is derived by using (range mid)*(Prob Max), the entry value can be derived by using a formula. For example, for a k-bit probability ($2^k$>P>0) and a 9-bits range, the probIdx can be calculated according to probIdx=(P>=$2^{k-1}$)? $2^{n+1}$−(P>>(k−n−1)): (P>>(k−n−1))+1. The rangeIdx is derived as 2*(range>>(8−m))+1. The rangeLPS can be calculated according to rangeLPS=(probIdx*rangeIdx)>>(k−n−m−6+1), where k can be 15, n can be 5, and m can be 3.

In another embodiment, if the rangeLPS table is derived by using (range min)*(Prob mid), the entry value can be derived by using a formula. For example, for a k-bit probability ($2^k$>P>0) and a 9-bits range, the probIdx' can be calculated according to probIdx'=(P>=$2^{k-1}$)? $2^{n+1}$−(P>>(k−n−1))−1: (P>>(k−n−1)). The probIdx is calculated according to probIdx=2*probIdx'+1. The rangeIdx is derived as (range>>(8−m)). The rangeLPS can be calculated according to rangeLPS=(probIdx*rangeIdx)>>(k−n−m−6+1), where k can be 15, n can be 5, and m can be 3. We can use an 8-bits*(1<<m)*(1<<n) table to store the pre-calculated rangeLPS value. For example, if n is 5 and m is 4, in Table 6, a 8-bits*16*32 table can be used to derive the rangeLPS value by using probIdx' and (range>>(8−m))&((1<<m)−1). For example, if n is 5 and m is 3, in Table 7, an 8-bits*8*32 table can be used to derive the rangeLPS value by using probIdx' and (range>>(8−m))&((1<<m)−1).

TABLE 6 rangeLPS table for a certain probability with (range min) * (Prob Mid)

| | | (Range >> 4)&15 rangeIdx | | | | | | | | | | | | | | | |
|---|---|---|---|---|---|---|---|---|---|---|---|---|---|---|---|---|---|
| | | 16 | 17 | 18 | 19 | 20 | 21 | 22 | 23 | 24 | 25 | 26 | 27 | 28 | 29 | 30 | 31 |
| | | | | | | | | | range Min | | | | | | | | |
| | | 256 | 272 | 288 | 304 | 320 | 336 | 352 | 368 | 384 | 400 | 416 | 432 | 448 | 464 | 480 | 496 |
| | | | | | | | | | range Max | | | | | | | | |
| | | 271 | 287 | 303 | 319 | 335 | 351 | 367 | 383 | 399 | 415 | 431 | 447 | 463 | 479 | 495 | 511 |
| Prob | probIdx' | | | | | | | | range Mid | | | | | | | | |
| Mid | (Prob >> 9) | 264 | 280 | 296 | 312 | 328 | 344 | 360 | 376 | 392 | 408 | 424 | 440 | 456 | 472 | 488 | 504 |
| 31.5/64 | 31 | 126 | 133 | 141 | 149 | 157 | 165 | 173 | 181 | 189 | 196 | 204 | 212 | 220 | 228 | 236 | 244 |
| 30.5/64 | 30 | 122 | 129 | 137 | 144 | 152 | 160 | 167 | 175 | 183 | 190 | 198 | 205 | 213 | 221 | 228 | 236 |
| 29.5/64 | 29 | 118 | 125 | 132 | 140 | 147 | 154 | 162 | 169 | 177 | 184 | 191 | 199 | 206 | 213 | 221 | 228 |
| 28.5/64 | 28 | 114 | 121 | 128 | 135 | 142 | 149 | 156 | 163 | 171 | 178 | 185 | 192 | 199 | 206 | 213 | 220 |
| 27.5/64 | 27 | 110 | 116 | 123 | 130 | 137 | 144 | 151 | 158 | 165 | 171 | 178 | 185 | 192 | 199 | 206 | 213 |
| 26.5/64 | 26 | 106 | 112 | 119 | 125 | 132 | 139 | 145 | 152 | 159 | 165 | 172 | 178 | 185 | 192 | 198 | 205 |
| 25.5/64 | 25 | 102 | 108 | 114 | 121 | 127 | 133 | 140 | 146 | 153 | 159 | 165 | 172 | 178 | 184 | 191 | 197 |
| 24.5/64 | 24 | 98 | 104 | 110 | 116 | 122 | 128 | 134 | 140 | 147 | 153 | 159 | 165 | 171 | 177 | 183 | 189 |
| 23.5/64 | 23 | 94 | 99 | 105 | 111 | 117 | 123 | 129 | 135 | 141 | 146 | 152 | 158 | 164 | 170 | 176 | 182 |
| 22.5/64 | 22 | 90 | 95 | 101 | 106 | 112 | 118 | 123 | 129 | 135 | 140 | 146 | 151 | 157 | 163 | 168 | 174 |
| 21.5/64 | 21 | 86 | 91 | 96 | 102 | 107 | 112 | 118 | 123 | 129 | 134 | 139 | 145 | 150 | 155 | 161 | 166 |
| 20.5/64 | 20 | 82 | 87 | 92 | 97 | 102 | 107 | 112 | 117 | 123 | 128 | 133 | 138 | 143 | 148 | 153 | 158 |
| 19.5/64 | 19 | 78 | 82 | 87 | 92 | 97 | 102 | 107 | 112 | 117 | 121 | 126 | 131 | 136 | 141 | 146 | 151 |
| 18.5/64 | 18 | 74 | 78 | 83 | 87 | 92 | 97 | 101 | 106 | 111 | 115 | 120 | 124 | 129 | 134 | 138 | 143 |
| 17.5/64 | 17 | 70 | 74 | 78 | 83 | 87 | 91 | 96 | 100 | 105 | 109 | 113 | 118 | 122 | 126 | 131 | 135 |
| 16.5/64 | 16 | 66 | 70 | 74 | 78 | 82 | 86 | 90 | 94 | 99 | 103 | 107 | 111 | 115 | 119 | 123 | 127 |
| 15.5/64 | 15 | 62 | 65 | 69 | 73 | 77 | 81 | 85 | 89 | 93 | 96 | 100 | 104 | 108 | 112 | 116 | 120 |
| 14.5/64 | 14 | 58 | 61 | 65 | 68 | 72 | 76 | 79 | 83 | 87 | 90 | 94 | 97 | 101 | 105 | 108 | 112 |
| 13.5/64 | 13 | 54 | 57 | 60 | 64 | 67 | 70 | 74 | 77 | 81 | 84 | 87 | 91 | 94 | 97 | 101 | 104 |
| 12.5/64 | 12 | 50 | 53 | 56 | 59 | 62 | 65 | 68 | 71 | 75 | 78 | 81 | 84 | 87 | 90 | 93 | 96 |
| 11.5/64 | 11 | 46 | 48 | 51 | 54 | 57 | 60 | 63 | 66 | 69 | 71 | 74 | 77 | 80 | 83 | 86 | 89 |
| 10.5/64 | 10 | 42 | 44 | 47 | 49 | 52 | 55 | 57 | 60 | 63 | 65 | 68 | 70 | 73 | 76 | 78 | 81 |
| 09.5/64 | 9 | 38 | 40 | 42 | 45 | 47 | 49 | 52 | 54 | 57 | 59 | 61 | 64 | 66 | 68 | 71 | 73 |
| 08.5/64 | 8 | 34 | 36 | 38 | 40 | 42 | 44 | 46 | 48 | 51 | 53 | 55 | 57 | 59 | 61 | 63 | 65 |
| 07.5/64 | 7 | 30 | 31 | 33 | 35 | 37 | 39 | 41 | 43 | 45 | 46 | 48 | 50 | 52 | 54 | 56 | 58 |
| 06.5/64 | 6 | 26 | 27 | 29 | 30 | 32 | 34 | 35 | 37 | 39 | 40 | 42 | 43 | 45 | 47 | 48 | 50 |
| 05.5/64 | 5 | 22 | 23 | 24 | 26 | 27 | 28 | 30 | 31 | 33 | 34 | 35 | 37 | 38 | 39 | 41 | 42 |
| 04.5/64 | 4 | 18 | 19 | 20 | 21 | 22 | 23 | 24 | 25 | 27 | 28 | 29 | 30 | 31 | 32 | 33 | 34 |
| 03.5/64 | 3 | 14 | 14 | 15 | 16 | 17 | 18 | 19 | 20 | 21 | 21 | 22 | 23 | 24 | 25 | 26 | 27 |
| 02.5/64 | 2 | 10 | 10 | 11 | 11 | 12 | 13 | 13 | 14 | 15 | 15 | 16 | 16 | 17 | 18 | 18 | 19 |
| 01.5/64 | 1 | 6 | 6 | 6 | 7 | 7 | 7 | 8 | 8 | 9 | 9 | 9 | 10 | 10 | 10 | 11 | 11 |
| 00.5/64 | 0 | 2 | 2 | 2 | 2 | 2 | 2 | 2 | 2 | 3 | 3 | 3 | 3 | 3 | 3 | 3 | 3 |

TABLE 7 rangeLPS table for a certain probability with (range min) * (Prob Mid)

| Prob Max | Prob Mid | Prob Min | probIdx' (Prob >> 9) | (Range >> 5)&7 rangeIdx | | | | | | | |
|---|---|---|---|---|---|---|---|---|---|---|---|
| | | | | 0 | 1 | 2 | 3 | 4 | 5 | 6 | 7 |
| | | | | 256 | 288 | 320 | 352 range Min 384 | | 416 | 448 | 480 |
| | | | | 287 | 319 | 351 | 383 range Max 415 | | 447 | 479 | 511 |
| | | | | 272 | 304 | 336 | 368 range Mid 400 | | 432 | 464 | 496 |
| 32/64 | 31.5/64 | 31/64 | 31 | 126 | 141 | 157 | 173 | 189 | 204 | 220 | 236 |
| 31/64 | 30.5/64 | 30/64 | 30 | 122 | 137 | 152 | 167 | 183 | 198 | 213 | 228 |
| 30/64 | 29.5/64 | 29/64 | 29 | 118 | 132 | 147 | 162 | 177 | 191 | 206 | 221 |
| 29/64 | 28.5/64 | 28/64 | 28 | 114 | 128 | 142 | 156 | 171 | 185 | 199 | 213 |
| 28/64 | 27.5/64 | 27/64 | 27 | 110 | 123 | 137 | 151 | 165 | 178 | 192 | 206 |
| 27/64 | 26.5/64 | 26/64 | 26 | 106 | 119 | 132 | 145 | 159 | 172 | 185 | 198 |
| 26/64 | 25.5/64 | 25/64 | 25 | 102 | 114 | 127 | 140 | 153 | 165 | 178 | 191 |
| 25/64 | 24.5/64 | 24/64 | 24 | 98 | 110 | 122 | 134 | 147 | 159 | 171 | 183 |
| 24/64 | 23.5/64 | 23/64 | 23 | 94 | 105 | 117 | 129 | 141 | 152 | 164 | 176 |
| 23/64 | 22.5/64 | 22/64 | 22 | 90 | 101 | 112 | 123 | 135 | 146 | 157 | 168 |
| 22/64 | 21.5/64 | 21/64 | 21 | 86 | 96 | 107 | 118 | 129 | 139 | 150 | 161 |
| 21/64 | 20.5/64 | 20/64 | 20 | 82 | 92 | 102 | 112 | 123 | 133 | 143 | 153 |
| 20/64 | 19.5/64 | 19/64 | 19 | 78 | 87 | 97 | 107 | 117 | 126 | 136 | 146 |
| 19/64 | 18.5/64 | 18/64 | 18 | 74 | 83 | 92 | 101 | 111 | 120 | 129 | 138 |
| 18/64 | 17.5/64 | 17/64 | 17 | 70 | 78 | 87 | 96 | 105 | 113 | 122 | 131 |
| 17/64 | 16.5/64 | 16/64 | 16 | 66 | 74 | 82 | 90 | 99 | 107 | 115 | 123 |
| 16/64 | 15.5/64 | 15/64 | 15 | 62 | 69 | 77 | 85 | 93 | 100 | 108 | 116 |
| 15/64 | 14.5/64 | 14/64 | 14 | 58 | 65 | 72 | 79 | 87 | 94 | 101 | 108 |
| 14/64 | 13.5/64 | 13/64 | 13 | 54 | 60 | 67 | 74 | 81 | 87 | 94 | 101 |
| 13/64 | 12.5/64 | 12/64 | 12 | 50 | 56 | 62 | 68 | 75 | 81 | 87 | 93 |
| 12/64 | 11.5/64 | 11/64 | 11 | 46 | 51 | 57 | 63 | 69 | 74 | 80 | 86 |
| 11/64 | 10.5/64 | 10/64 | 10 | 42 | 47 | 52 | 57 | 63 | 68 | 73 | 78 |
| 10/64 | 09.5/64 | 09/64 | 9 | 38 | 42 | 47 | 52 | 57 | 61 | 66 | 71 |
| 09/64 | 08.5/64 | 08/64 | 8 | 34 | 38 | 42 | 46 | 51 | 55 | 59 | 63 |
| 08/64 | 07.5/64 | 07/64 | 7 | 30 | 33 | 37 | 41 | 45 | 48 | 52 | 56 |
| 07/64 | 06.5/64 | 06/64 | 6 | 26 | 29 | 32 | 35 | 39 | 42 | 45 | 48 |
| 06/64 | 05.5/64 | 05/64 | 5 | 22 | 24 | 27 | 30 | 33 | 35 | 38 | 41 |
| 05/64 | 04.5/64 | 04/64 | 4 | 18 | 20 | 22 | 24 | 27 | 29 | 31 | 33 |
| 04/64 | 03.5/64 | 03/64 | 3 | 14 | 15 | 17 | 19 | 21 | 22 | 24 | 26 |
| 03/64 | 02.5/64 | 02/64 | 2 | 10 | 11 | 12 | 13 | 15 | 16 | 17 | 18 |
| 02/64 | 01.5/64 | 01/64 | 1 | 6 | 6 | 7 | 8 | 9 | 9 | 10 | 11 |
| 01/64 | 00.5/64 | 00/64 | 0 | 2 | 2 | 2 | 2 | 3 | 3 | 3 | 3 |

In another embodiment, if the rangeLPS table is derived by using (range mid)*(Prob mid), the entry value can be derived by using a formula. For example, for a k-bit probability ($2^k$>P>0) and a 9-bits range, the probIdx' can be calculated according to probIdx'=(P>=$2^{k-1}$)? $2^{n+1}$−(P>>(k−n−1))−1: (P>>(k−n−1)), or probIdx'=(P>=$2^{k-1}$)? ($2^k$−P−1)>>(k−n−1): (P>>(k−n−1)). The probIdx is calculated according to probIdx=2*probIdx'+1. The rangeIdx is derived as 2*(range>>(8−m))+1. The rangeLPS can be calculated according to rangeLPS=(probIdx*rangeIdx)>>(k−n−m−6+2), k can be 15, n can be 5, and m can be 3. For example, the probIdx' can be calculated according to probIdx'=(P>=16384)? (32767−P)>>9: P>>9, or probIdx'=(P>=16384)? 63−(P>>9): (P>>9). The probIdx is calculated according to probIdx=2*probIdx'+1. The rangeIdx is derived as 2*(range>>5)+1. The rangeLPS can be calculated according to rangeLPS=(probIdx*rangeIdx)>>3. We can use an 8-bits*(1<<m)*(1<<n) table to store the pre-calculated rangeLPS value. For example, if n is 5 and m is 3, in Table 8, an 8-bits*8*32 table can be used to derive the rangeLPS value by using probIdx' and (range>>(8−m))&((1<<m)−1). For example to derive the RangeOne (or RangeZero), the probIdx' can be calculated according to probIdx'=(P>=$2^{k-1}$)? ($2^k$−1−P)>>(k−n−1): P>>(k−n−1), or probIdx'=(P>=$2^{k-1}$)? $2^{n+1}$−(P>>(k−n−1))−1: (P>>(k−n−1)). The rangeIdx' is derived as (range>>(8−m))−(256>>m), ((range−256)>>(8−m)), or (range>>(8−m))&($2^m$−1). The rangeLPS can be calculated according to rangeLPS=rangeLPSTable[probIdx'][rangeIdx']. If P is equal to or larger than $2^{k-1}$ (i.e., the k-th bit of P equal to 1), the rangeOne and rangeZero can be calculated according to rangeOne=range−rangeLPS and rangeZero=rangeLPS respectively. Otherwise (i.e., P smaller than $2^{k-1}$), the rangeOne and rangeZero can be calculated according to rangeOne=rangeLPS and rangeZero=range−rangeLPS respectively. For example, if k is 15 and if the n is 5 and m is 3, the probIdx' can be calculated according to probIdx'=(P>=16384)? (32767−P)>>9: P>>9, or probIdx'=(P>=16384)? 63−(P>>9): (P>>9). The rangeIdx' is derived as (range>>5)&7. The rangeLPS can be calculated according to rangeLPS=rangeLPSTable[probIdx'][rangeIdx']. If P is equal to or larger than 16384, the rangeOne and rangeZero can be calculated according to rangeOne=range−rangeLPS and rangeZero=rangeLPS respectively. Otherwise (i.e., P smaller than 16384), the rangeOne and rangeZero can be calculated according to rangeOne=rangeLPS and rangeZero=range−rangeLPS.

TABLE 8 rangeLPS table for a certain probability with (range Mid) * (Prob Mid)

| | | | | (Range >> 5)&7 rangeIdx | | | | | | | |
|---|---|---|---|---|---|---|---|---|---|---|---|
| | | | | 0 | 1 | 2 | 3 | 4 | 5 | 6 | 7 |
| | | | | | | | range Min | | | | |
| | | | | 256 | 288 | 320 | 352 | 384 | 416 | 448 | 480 |
| | | | | | | | range Max | | | | |
| | | | | 287 | 319 | 351 | 383 | 415 | 447 | 479 | 511 |
| Prob | Prob | Prob | probIdx' | | | | range Mid | | | | |
| Max | Mid | Min | (Prob >> 9) | 272 | 304 | 336 | 368 | 400 | 432 | 464 | 496 |
| 32/64 | 31.5/64 | 31/64 | 31 | 133 | 149 | 165 | 181 | 196 | 212 | 228 | 244 |
| 31/64 | 30.5/64 | 30/64 | 30 | 129 | 144 | 160 | 175 | 190 | 205 | 221 | 236 |
| 30/64 | 29.5/64 | 29/64 | 29 | 125 | 140 | 154 | 169 | 184 | 199 | 213 | 228 |
| 29/64 | 28.5/64 | 28/64 | 28 | 121 | 135 | 149 | 163 | 178 | 192 | 206 | 220 |
| 28/64 | 27.5/64 | 27/64 | 27 | 116 | 130 | 144 | 158 | 171 | 185 | 199 | 213 |
| 27/64 | 26.5/64 | 26/64 | 26 | 112 | 125 | 139 | 152 | 165 | 178 | 192 | 205 |
| 26/64 | 25.5/64 | 25/64 | 25 | 108 | 121 | 133 | 146 | 159 | 172 | 184 | 197 |
| 25/64 | 24.5/64 | 24/64 | 24 | 104 | 116 | 128 | 140 | 153 | 165 | 177 | 189 |
| 24/64 | 23.5/64 | 23/64 | 23 | 99 | 111 | 123 | 135 | 146 | 158 | 170 | 182 |
| 23/64 | 22.5/64 | 22/64 | 22 | 95 | 106 | 118 | 129 | 140 | 151 | 163 | 174 |
| 22/64 | 21.5/64 | 21/64 | 21 | 91 | 102 | 112 | 123 | 134 | 145 | 155 | 166 |
| 21/64 | 20.5/64 | 20/64 | 20 | 87 | 97 | 107 | 117 | 128 | 138 | 148 | 158 |
| 20/64 | 19.5/64 | 19/64 | 19 | 82 | 92 | 102 | 112 | 121 | 131 | 141 | 151 |
| 19/64 | 18.5/64 | 18/64 | 18 | 78 | 87 | 97 | 106 | 115 | 124 | 134 | 143 |
| 18/64 | 17.5/64 | 17/64 | 17 | 74 | 83 | 91 | 100 | 109 | 118 | 126 | 135 |
| 17/64 | 16.5/64 | 16/64 | 16 | 70 | 78 | 86 | 94 | 103 | 111 | 119 | 127 |
| 16/64 | 15.5/64 | 15/64 | 15 | 65 | 73 | 81 | 89 | 96 | 104 | 112 | 120 |
| 15/64 | 14.5/64 | 14/64 | 14 | 61 | 68 | 76 | 83 | 90 | 97 | 105 | 112 |
| 14/64 | 13.5/64 | 13/64 | 13 | 57 | 64 | 70 | 77 | 84 | 91 | 97 | 104 |
| 13/64 | 12.5/64 | 12/64 | 12 | 53 | 59 | 65 | 71 | 78 | 84 | 90 | 96 |
| 12/64 | 11.5/64 | 11/64 | 11 | 48 | 54 | 60 | 66 | 71 | 77 | 83 | 89 |
| 11/64 | 10.5/64 | 10/64 | 10 | 44 | 49 | 55 | 60 | 65 | 70 | 76 | 81 |
| 10/64 | 09.5/64 | 09/64 | 9 | 40 | 45 | 49 | 54 | 59 | 64 | 68 | 73 |
| 09/64 | 08.5/64 | 08/64 | 8 | 36 | 40 | 44 | 48 | 53 | 57 | 61 | 65 |
| 08/64 | 07.5/64 | 07/64 | 7 | 31 | 35 | 39 | 43 | 46 | 50 | 54 | 58 |
| 07/64 | 06.5/64 | 06/64 | 6 | 27 | 30 | 34 | 37 | 40 | 43 | 47 | 50 |
| 06/64 | 05.5/64 | 05/64 | 5 | 23 | 26 | 28 | 31 | 34 | 37 | 39 | 42 |
| 05/64 | 04.5/64 | 04/64 | 4 | 19 | 21 | 23 | 25 | 28 | 30 | 32 | 34 |
| 04/64 | 03.5/64 | 03/64 | 3 | 14 | 16 | 18 | 20 | 21 | 23 | 25 | 27 |
| 03/64 | 02.5/64 | 02/64 | 2 | 10 | 11 | 13 | 14 | 15 | 16 | 18 | 19 |
| 02/64 | 01.5/64 | 01/64 | 1 | 6 | 7 | 7 | 8 | 9 | 10 | 10 | 11 |
| 01/64 | 00.5/64 | 00/64 | 0 | 2 | 2 | 2 | 2 | 3 | 3 | 3 | 3 |

The general form, for a k-bit probability ($2^k$>P>0) and a 9-bits range, the probIdx' can be calculated according to probIdx'=(P>=$2^{k-1}$)? $2^{n+1}$-(P>>(k-n-1))-1: (P>>(k-n-1)). The probIdx is calculated according to probIdx=a*probIdx'+b. The rangeIdx is derived as c*(range>>(8-m))+d. The rangeLPS can be calculated according to rangeLPS= ((probIdx*rangeIdx+e)>>(k-n-m-6))/a/c+f. There a, b, c, d, e, f are predefined integer values or derived values, k can be 15, n can be 5, and m can be 3.

For the above general form, if the f is zero (i.e., no offset is added), some methods are proposed to prevent the value of the derived rangeLPS to be too small. In one method, the clip is used. If the rangeLPS is smaller than a threshold, the rangeLPS value is set as the threshold. The threshold can be 2, 3, or 4. In another method, the rangeLPS is "bit-wise or" with a value. The value can be 2, 3, or 4. For example, the rangeLPS=(rangeLPS|value), or rangeLPS=(rangeLPS OR value).

For example, the a and c are equal to 1, b, c, d, and e are equal to 0, f is equal to 4. If 16-bit probability ($2^{16}$>P>0) and a 9-bits range is used, n is 5, m is 3, the probIdx= (P>=16384)? 63-(P>>9): (P>>9). The rangeIdx is derived as (range>>5). The rangeLPS=((probIdx*rangeIdx)>>1)+4. We can use an 8-bits*(1<<m)*(1<<n) table to store the pre-calculated rangeLPS value. For example, if n is 5 and m is 3, in Table 9, an 8-bits*8*32 table can be used to derive the rangeLPS value.

In another example, if 16-bit probability ($2^{16}$>P>0) and a 9-bits range is used, n is 5, m is 3, the probIdx=(P>=16384)? 63-(P>>9): (P>>9). The rangeIdx is derived as (range>>5). The rangeLPS=((probIdx*rangeIdx)>>1) 4. In another example, if ((probIdx*rangeIdx)>>1)<4, rangeLPS is set equal to 4. Otherwise, the rangeLPS is set equal to ((probIdx*rangeIdx)>>1).

TABLE 9 rangeLPS table for a certain probability with ((probIdx * rangeIdx) >> 1) + 4

| | | | | (Range >> 5)&7 rangeIdx | | | | | | | |
|---|---|---|---|---|---|---|---|---|---|---|---|
| | | | | 0 | 1 | 2 | 3 | 4 | 5 | 6 | 7 |
| | | | | | | | range Min | | | | |
| | | | | 256 | 288 | 320 | 352 | 384 | 416 | 448 | 480 |
| | | | | | | | | range Max | | | |
| | | | | 287 | 319 | 351 | 383 | 415 | 447 | 479 | 511 |
| Prob | Prob | Prob | probIdx' | | | | | range Mid | | | |
| Max | Mid | Min | (Prob >> 9) | 272 | 304 | 336 | 368 | 400 | 432 | 464 | 496 |
| 32/64 | 31.5/64 | 31/64 | 31 | 128 | 143 | 159 | 174 | 190 | 205 | 221 | 236 |
| 31/64 | 30.5/64 | 30/64 | 30 | 124 | 139 | 154 | 169 | 184 | 199 | 214 | 229 |
| 30/64 | 29.5/64 | 29/64 | 29 | 120 | 134 | 149 | 163 | 178 | 192 | 207 | 221 |
| 29/64 | 28.5/64 | 28/64 | 28 | 116 | 130 | 144 | 158 | 172 | 186 | 200 | 214 |
| 28/64 | 27.5/64 | 27/64 | 27 | 112 | 125 | 139 | 152 | 166 | 179 | 193 | 206 |
| 27/64 | 26.5/64 | 26/64 | 26 | 108 | 121 | 134 | 147 | 160 | 173 | 186 | 199 |
| 26/64 | 25.5/64 | 25/64 | 25 | 104 | 116 | 129 | 141 | 154 | 166 | 179 | 191 |
| 25/64 | 24.5/64 | 24/64 | 24 | 100 | 112 | 124 | 136 | 148 | 160 | 172 | 184 |
| 24/64 | 23.5/64 | 23/64 | 23 | 96 | 107 | 119 | 130 | 142 | 153 | 165 | 176 |
| 23/64 | 22.5/64 | 22/64 | 22 | 92 | 103 | 114 | 125 | 136 | 147 | 158 | 169 |
| 22/64 | 21.5/64 | 21/64 | 21 | 88 | 98 | 109 | 119 | 130 | 140 | 151 | 161 |
| 21/64 | 20.5/64 | 20/64 | 20 | 84 | 94 | 104 | 114 | 124 | 134 | 144 | 154 |
| 20/64 | 19.5/64 | 19/64 | 19 | 80 | 89 | 99 | 108 | 118 | 127 | 137 | 146 |
| 19/64 | 18.5/64 | 18/64 | 18 | 76 | 85 | 94 | 103 | 112 | 121 | 130 | 139 |
| 18/64 | 17.5/64 | 17/64 | 17 | 72 | 80 | 89 | 97 | 106 | 114 | 123 | 131 |
| 17/64 | 16.5/64 | 16/64 | 16 | 68 | 76 | 84 | 92 | 100 | 108 | 116 | 124 |
| 16/64 | 15.5/64 | 15/64 | 15 | 64 | 71 | 79 | 86 | 94 | 101 | 109 | 116 |
| 15/64 | 14.5/64 | 14/64 | 14 | 60 | 67 | 74 | 81 | 88 | 95 | 102 | 109 |
| 14/64 | 13.5/64 | 13/64 | 13 | 56 | 62 | 69 | 75 | 82 | 88 | 95 | 101 |
| 13/64 | 12.5/64 | 12/64 | 12 | 52 | 58 | 64 | 70 | 76 | 82 | 88 | 94 |
| 12/64 | 11.5/64 | 11/64 | 11 | 48 | 53 | 59 | 64 | 70 | 75 | 81 | 86 |
| 11/64 | 10.5/64 | 10/64 | 10 | 44 | 49 | 54 | 59 | 64 | 69 | 74 | 79 |
| 10/64 | 09.5/64 | 09/64 | 9 | 40 | 44 | 49 | 53 | 58 | 62 | 67 | 71 |
| 09/64 | 08.5/64 | 08/64 | 8 | 36 | 40 | 44 | 48 | 52 | 56 | 60 | 64 |
| 08/64 | 07.5/64 | 07/64 | 7 | 32 | 35 | 39 | 42 | 46 | 49 | 53 | 56 |
| 07/64 | 06.5/64 | 06/64 | 6 | 28 | 31 | 34 | 37 | 40 | 43 | 46 | 49 |
| 06/64 | 05.5/64 | 05/64 | 5 | 24 | 26 | 29 | 31 | 34 | 36 | 39 | 41 |
| 05/64 | 04.5/64 | 04/64 | 4 | 20 | 22 | 24 | 26 | 28 | 30 | 32 | 34 |
| 04/64 | 03.5/64 | 03/64 | 3 | 16 | 17 | 19 | 20 | 22 | 23 | 25 | 26 |
| 03/64 | 02.5/64 | 02/64 | 2 | 12 | 13 | 14 | 15 | 16 | 17 | 18 | 19 |
| 02/64 | 01.5/64 | 01/64 | 1 | 8 | 8 | 9 | 9 | 10 | 10 | 11 | 11 |
| 01/64 | 00.5/64 | 00/64 | 0 | 4 | 4 | 4 | 4 | 4 | 4 | 4 | 4 |

For the derived rangeLPS, it's value can be clipped within a threshold. The threshold can be a fixed value, a predefined value, a signalled value (signalled in sequence/picture/slice/tile-level), or an adaptive value that corresponds to the current range (or range index) or the current probability (or probability index, LPS probability, LPS probability index). In one example, the threshold equal to minimum range in this range index—128 or minimum range in this range index—2q−2, where the q is the bits used for the current range. For example, if a 9-bits range is used and the rangeIdx is derived as (range>>5), the minimum range in this rangeIdx is equal to (rangeIdx<<5). The threshold is equal to (rangeIdx<<5)−128. If the rangeLPS is larger than this threshold, the rangeLPS is set equal to the threshold; otherwise, the rangeLPS is not changed. Table 10 shows the modified Table 8 that the maximum rangeLPS constraint is considered. In another example, the threshold equal to current range—128 or current range—2q−2, where the q is the bits used for the current range. For example, if a 9-bits range is used, the threshold is equal to range—128. If the rangeLPS is larger than this threshold, the rangeLPS is set equal to the threshold; otherwise, the rangeLPS is not changed.

TABLE 10

| rangeLPS table for a certain probability with (range Mid) * (Prob Mid) | | | | | | | | | | | |
|---|---|---|---|---|---|---|---|---|---|---|---|
| | | | | (Range >> 5)&7 rangeIdx | | | | | | | |
| | | | | 0 | 1 | 2 | 3 | 4 | 5 | 6 | 7 |
| | | | | | | | | range Min | | | |
| | | | | 256 | 288 | 320 | 352 | 384 | 416 | 448 | 480 |
| | | | | | | | | range Max | | | |
| | | | | 287 | 319 | 351 | 383 | 415 | 447 | 479 | 511 |
| Prob Max | Prob Mid | Prob Min | probIdx' (Prob >> 9) | 272 | 304 | 336 | 368 | range Mid 400 | 432 | 464 | 496 |
| 32/64 | 31.5/64 | 31/64 | 31 | 128 | 149 | 165 | 181 | 196 | 212 | 228 | 244 |
| 31/64 | 30.5/64 | 30/64 | 30 | 128 | 144 | 160 | 175 | 190 | 205 | 221 | 236 |
| 30/64 | 29.5/64 | 29/64 | 29 | 125 | 140 | 154 | 169 | 184 | 199 | 213 | 228 |
| 29/64 | 28.5/64 | 28/64 | 28 | 121 | 135 | 149 | 163 | 178 | 192 | 206 | 220 |
| 28/64 | 27.5/64 | 27/64 | 27 | 116 | 130 | 144 | 158 | 171 | 185 | 199 | 213 |
| 27/64 | 26.5/64 | 26/64 | 26 | 112 | 125 | 139 | 152 | 165 | 178 | 192 | 205 |
| 26/64 | 25.5/64 | 25/64 | 25 | 108 | 121 | 133 | 146 | 159 | 172 | 184 | 197 |
| 25/64 | 24.5/64 | 24/64 | 24 | 104 | 116 | 128 | 140 | 153 | 165 | 177 | 189 |
| 24/64 | 23.5/64 | 23/64 | 23 | 99 | 111 | 123 | 135 | 146 | 158 | 170 | 182 |
| 23/64 | 22.5/64 | 22/64 | 22 | 95 | 106 | 118 | 129 | 140 | 151 | 163 | 174 |
| 22/64 | 21.5/64 | 21/64 | 21 | 91 | 102 | 112 | 123 | 134 | 145 | 155 | 166 |
| 21/64 | 20.5/64 | 20/64 | 20 | 87 | 97 | 107 | 117 | 128 | 138 | 148 | 158 |
| 20/64 | 19.5/64 | 19/64 | 19 | 82 | 92 | 102 | 112 | 121 | 131 | 141 | 151 |
| 19/64 | 18.5/64 | 18/64 | 18 | 78 | 87 | 97 | 106 | 115 | 124 | 134 | 143 |
| 18/64 | 17.5/64 | 17/64 | 17 | 74 | 83 | 91 | 100 | 109 | 118 | 126 | 135 |
| 17/64 | 16.5/64 | 16/64 | 16 | 70 | 78 | 86 | 94 | 103 | 111 | 119 | 127 |
| 16/64 | 15.5/64 | 15/64 | 15 | 65 | 73 | 81 | 89 | 96 | 104 | 112 | 120 |
| 15/64 | 14.5/64 | 14/64 | 14 | 61 | 68 | 76 | 83 | 90 | 97 | 105 | 112 |
| 14/64 | 13.5/64 | 13/64 | 13 | 57 | 64 | 70 | 77 | 84 | 91 | 97 | 104 |
| 13/64 | 12.5/64 | 12/64 | 12 | 53 | 59 | 65 | 71 | 78 | 84 | 90 | 96 |
| 12/64 | 11.5/64 | 11/64 | 11 | 48 | 54 | 60 | 66 | 71 | 77 | 83 | 89 |
| 11/64 | 10.5/64 | 10/64 | 10 | 44 | 49 | 55 | 60 | 65 | 70 | 76 | 81 |
| 10/64 | 09.5/64 | 09/64 | 9 | 40 | 45 | 49 | 54 | 59 | 64 | 68 | 73 |
| 09/64 | 08.5/64 | 08/64 | 8 | 36 | 40 | 44 | 48 | 53 | 57 | 61 | 65 |
| 08/64 | 07.5/64 | 07/64 | 7 | 31 | 35 | 39 | 43 | 46 | 50 | 54 | 58 |
| 07/64 | 06.5/64 | 06/64 | 6 | 27 | 30 | 34 | 37 | 40 | 43 | 47 | 50 |
| 06/64 | 05.5/64 | 05/64 | 5 | 23 | 26 | 28 | 31 | 34 | 37 | 39 | 42 |
| 05/64 | 04.5/64 | 04/64 | 4 | 19 | 21 | 23 | 25 | 28 | 30 | 32 | 34 |
| 04/64 | 03.5/64 | 03/64 | 3 | 14 | 16 | 18 | 20 | 21 | 23 | 25 | 27 |
| 03/64 | 02.5/64 | 02/64 | 2 | 10 | 11 | 13 | 14 | 15 | 16 | 18 | 19 |
| 02/64 | 01.5/64 | 01/64 | 1 | 6 | 7 | 7 | 8 | 9 | 10 | 10 | 11 |
| 01/64 | 00.5/64 | 00/64 | 0 | 2 | 2 | 2 | 2 | 3 | 3 | 3 | 3 |

Note that, since the $2^k-1$ is all ones in binary representation, so the $2^k-1-P$ is just to do the bitwise inverse for k−1 bits of LSB (less significant bit). In hardware implementation, we can do bitwise exclusive or (XOR) for the k-th bit of P and the 1 to k−1-th bits of P to derive the probLPS or probIdx.

In the foregoing embodiments, the size of rangeLPS table can be reduced significantly. Compared with the look up table used in JCTVC-F254 and VCEG-AZ07, the present application can use a smaller look up table, the size is 1/72, 1/144, or 1/288 of the look up table size used in JCTVC-F254 and VCEG-AZ07. Besides, the entire values in the rangeLPS table can be derived by using multiplier, which is easy to implement by using a hardware description language such as Verilog. The value derived from look up table is the same as the value derived by using multiplier. The designer can select the suitable implementation method for deriving the rangeLPS, rangeOne, or rangeZero. The present application provides the design flexibility for implementation.

MV Storage Precision

In HEVC, the MV precision is quarter-pel resolution. The MV is stored in a 16-bits buffer, which defines the MV range that is in $-2^{15}$ to $2^{15}-1$. The effective MV range is in [−8192.00, 8191.75] (unit in pixel).

In the next generation video coding, higher MV precision is preferred. The MV precision can be 1/8-pel, 1/16-pel, or finer. If the MV bit-width is fixed or the MV buffer size is fixed, there are two methods to store the MVs in different MV precisions.

A. Store all MV in Highest Precision

If a system has different MV resolution, it stores all MVs in the highest precision. The low precision MV is left-shifted and clipped to become a high precision MV. The clipping is to limit the maximum effective MV range. For example, if the MV bit-width is 16 bits and the precision is 1/16-pel, the effective MV range is in [−2048.00, 2047.09375] (unit in pixel). The lower precision MV is left-shifted to the same precision, clipped in the range of [−2048.00, 2047.09375] and stored. In another embodiment, the lower precision MV is clipped in the range of [−2048.00, 2047.09375] in low precision and then left-shifted to high precision.

B. Store all MV in Low Precision

If a system has different MV resolution, it stores all MVs in the low precision for MV referencing. But in intermediate process, e.g. motion compensation, affine MV derivation, the high precision MV is used for the process. After the process, the MV is stored in low precision.

C. Store MV in Different Precision

For each MV, a MV resolution index is used to represent the MV precision of the MV. Different MV resolution can have different effective MV range.

D. Method A/C with Low MV Precision for Temporal Collocated MV

In this embodiment, the method A and/or C can be used for storing the MV in current picture. However, the MV is stored in low precision in a MV buffer which is used for temporal collocated MV referencing.

MVP Derivation

Figure 3:
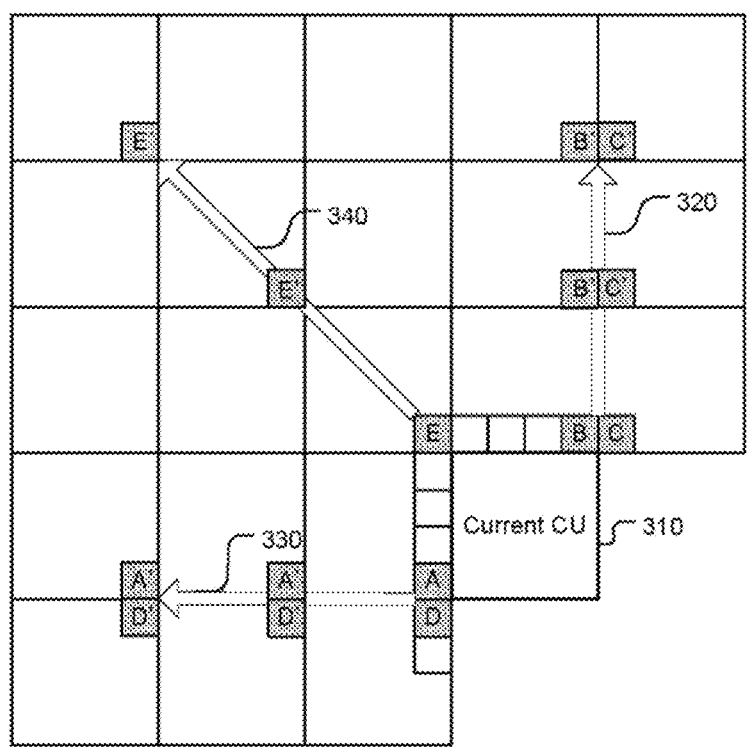
FIG. 3 illustrates an example of using extended neighbouring blocks for merge candidate list derivation according to JVET-J0058.

In JVET-J0058 (Ye et al., "Merge mode modification on top of Tencent's software in response to CfP", Joint Video Experts Team (JVET) of ITU-T SG 16 WP 3 and ISO/IEC JTC 1/SC 29/WG 11, 10th Meeting: San Diego, US, 10-20 Apr. 2018, Document: JVET-J0058), a modified merge candidate derivation method is disclosed. Not only the neighbouring 4×4 MVs are used for merge candidate list derivation, but also the 4×4 MVs within left 96 pixels and above 96 pixels range are used for merge candidate list derivation, as illustrated in FIG. 3. In FIG. 3, neighbouring block E is located at the upper-left corner of the current block 310, neighbouring blocks B and C are located at the upper and upper-right locations of the current block 310, and neighbouring blocks A and D are located at the left and lower-left locations of the current block 310. According to JVET-J0058, additional merge candidates are used by extending blocks B and C vertically 320, blocks A and D horizontally 320 and block E diagonally 340 at the block grid having a grid size same as the current block size. Therefore, a lot of MVs are required to store in the memory for merge candidate list derivation.

Figure 4:
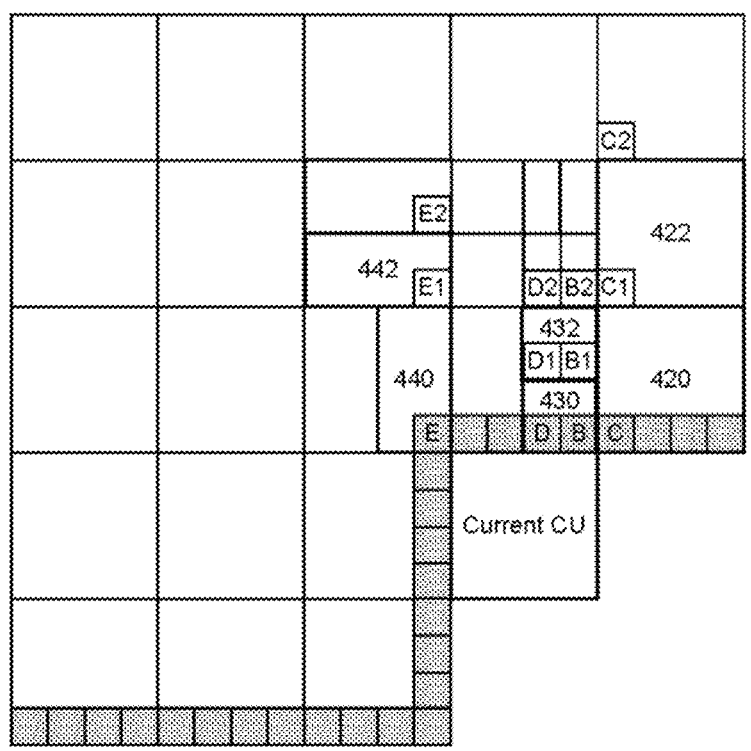
FIG. 4 illustrates an example of using extended neighbouring blocks for merge candidate list derivation according to an embodiment of the present invention.

In this invention, we propose to access the coded MV information in different CUs, as shown in FIG. 4. According to the present invention, the grid for locating extended neighbouring blocks is based on the size of the block containing the neighbouring block. For example, neighbouring block C is contained in coding block 420 and the neighbouring block C1 is used for extended merge candidate. Furthermore, block C1 is contained in coding block 422 and the neighbouring block C2 is used for extended merge candidate. For neighbouring blocks D and B, both are contained in coding block 430 and blocks D1 and B1 are used as extended merge candidate. Furthermore, neighbouring blocks D1 and B1 are contained in coding block 432 and blocks D2 and B2 are used as extended merge candidate. For neighbouring block E, the block is contained in coding block 440 and block E1 above block 440 is used as extended merge candidate. Furthermore, neighbouring blocks E1 are contained in coding block 442 and block E2 is used as extended merge candidate. Compared with the method proposed in JVET-J0058, the position of the accessed block is not a fixed position. It depends on the coded CU size. For example, in the above figure, the distance of B, B', and B' blocks are the same, which equal to the CU height. In the below figure, the B, B1, and B2 depends on the CU height of the CUs contain block B, B1, and B2. In another word, it retrieves multiple MV information of different CUs along some directions or some rules. The maximum distance of retrieved block can be limited within a range. For example, one, two, three CTU width and/or CTU height, or not exceed current CTU row.

Figure 5:
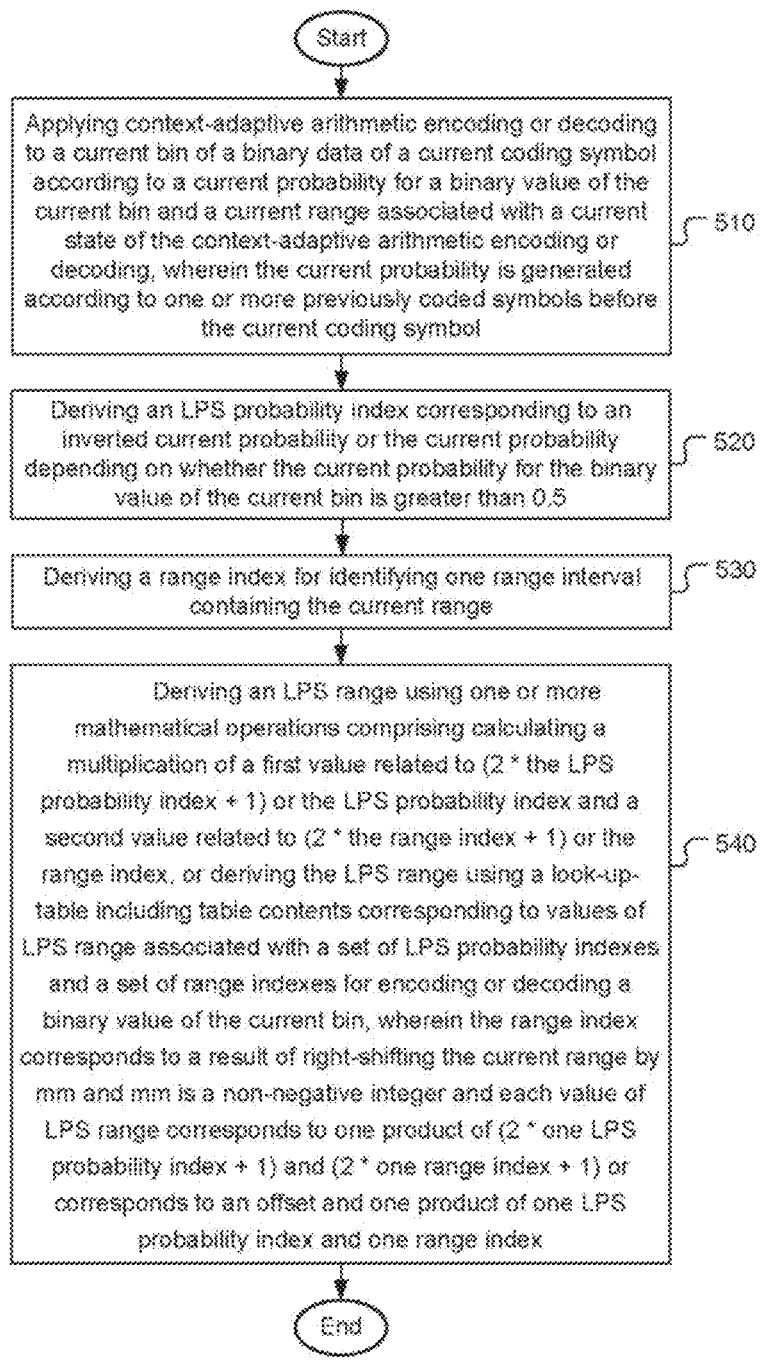
FIG. 5 illustrates an exemplary flowchart of context-based adaptive binary arithmetic coding (CABAC) according to one embodiment of the present invention.

FIG. 5 illustrates an exemplary flowchart of context-based adaptive binary arithmetic coding (CABAC) according to one embodiment of the present invention. The steps shown in the flowchart, as well as other flowcharts in this disclosure, may be implemented as program codes executable on one or more processors (e.g., one or more CPUs) at the encoder side and/or the decoder side. The steps shown in the flowchart may also be implemented based on hardware such as one or more electronic devices or processors arranged to perform the steps in the flowchart. According to this embodiment, context-adaptive arithmetic encoding or decoding is applied to a current bin of a binary data of a current coding symbol according to a current probability for a binary value of the current bin and a current range associated with the current state of the arithmetic coder, wherein the current probability is generated according to one or more previously coded symbols before the current coding symbol in step 510. For a video coding system, the coding symbols may correspond to transformed and quantized prediction residues, motion information for Inter predicted block, and various coding parameters such as coding modes. The coding symbols are binarized to generate a binary string. The CABAC coding may be applied to the binary string. An LPS probability index corresponding to an inverted current probability or the current probability is derived in step 520 depending on whether the current probability for the binary value of the current bin is greater than 0.5 (or $2^{k-1}$ if the current probability is represented by k-bit values). Various ways to derive the LPS probability index has been disclosed in this application. For example, if the current probability for the binary value of the current bin is greater than 0.5, an LPS (least-probably-symbol) probability is set equal to (1−the current probability) and otherwise, the LPS probability is set equal to the current probability; and the LPS probability index is determined based on a target index indicating one probability interval containing the current probability. A range index for identifying one range interval containing the current range is derived in step 530. An LPS range is derived either using one or more mathematical operations comprising calculating a multiplication of a first value related to (2*the LPS probability index+1) or the LPS probability index and a second value related to (2*a the range index+1) or the range index, or using a look-up-table including table contents corresponding to values of LPS range associated with a set of LPS probability indexes and a set of range indexes for encoding or decoding a binary value of the current bin in step 540, where the range index corresponds to a result of right-shifting the current range by mm and mm is a non-negative integer and each value of LPS range corresponds to one product of (2*one LPS probability index+1) and (2*one range index+1) or corresponds to a offset and one product of one LPS probability index and one range index.

The flowcharts shown are intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of entropy coding of coding symbols, the method comprising:
   applying context-adaptive arithmetic encoding or decoding to a current bin of a binary data of a current coding symbol according to a current probability for a binary value of the current bin and a current range associated with a current state of the context-adaptive arithmetic encoding or decoding, wherein the current probability is generated according to one or more previously coded symbols before the current coding symbol;
   deriving an LPS probability index corresponding to an inverted current probability or the current probability depending on whether the current probability for the binary value of the current bin is greater than 0.5;
   deriving a range index for identifying one range interval containing the current range; and
   deriving an LPS range using one or more mathematical operations comprising calculating a multiplication of a first value related to (2*the LPS probability index+1) or the LPS probability index and a second value related to (2*the range index+1) or the range index, or deriving the LPS range using a look-up-table including table contents corresponding to values of LPS range associated with a set of LPS probability indexes and a set of range indexes for encoding or decoding a binary value of the current bin, wherein the range index corresponds to a result of right-shifting the current range by mm and mm is a non-negative integer and each value of LPS range corresponds to one product of (2*one LPS probability index+1) and (2*one range index+1) or deriving an LPS range corresponds to an offset and one product of one LPS probability index and one range index.

2. The method of claim 1, wherein when the current probability for the binary value of the current bin is greater than 0.5, an LPS (least-probably-symbol) probability is set equal to (1−the current probability) and otherwise, the LPS probability is set equal to the current probability; and the LPS probability index is determined based on a target index indicating one probability interval containing the current probability or the LPS probability.

3. The method of claim 1, wherein when the current probability for the binary value of the current bin is greater than $2^{k-1}$ or is greater than or equal to $2^{k-1}$, an LPS probability is set equal to ($2^k$−1−the current probability) and the LPS probability index is set equal to ($2^{n+1}$−1) minus a result of right-shifting the current probability by (k−n−1) bits; otherwise, the LPS probability is set equal to the current probability and the LPS probability index is set equal to the result of right-shifting the current probability by (k−n−1) bits; and wherein the current probability is represented by k-bit values, and n and k are positive integers.

4. The method of claim 3, wherein k is equal to 15, and n is equal to 5.

5. The method of claim 3, wherein the LPS range is derived by multiplying (2*the LPS probability index+1) with (2*the range index+1) to obtain a multiplication result, and right-shifting the multiplication result by x bits and x is a positive integer.

6. The method of claim 5, wherein x is equal to 3.

7. The method of claim 3, wherein the LPS range is derived by multiplying the LPS probability index with the range index to obtain a multiplication result, and right-shifting the multiplication result by x bits plus an offset and x is a positive integer, the offset is an integer.

8. The method of claim 7, wherein x is equal to 1, and the offset is equal to 2, 3, or 4.

9. The method of claim 1, wherein the look-up-table corresponds to a two-dimensional table with the LPS probability index as a first table index in a first dimension and a clipped range index as a second table index in a second dimension, where the clipped range index corresponding to the range index.

10. The method of claim 9, wherein the LPS probability index has a first value range from 0 to 31, the clipped range index has a second value range from 0 to 7 and the LPS range has a third value range from greater than or equal to 0 to smaller than or equal to 255.

11. The method of claim 10, wherein the look-up-table corresponds to:

| probIdx, (ProbLPS >> 9) | (range >> 5)&7 rangeIdx | | | | | | | |
|---|---|---|---|---|---|---|---|---|
| | 0 | 1 | 2 | 3 | 4 | 5 | 6 | 7 |
| 31 | 133 | 149 | 165 | 181 | 196 | 212 | 228 | 244 |
| 30 | 129 | 144 | 160 | 175 | 190 | 205 | 221 | 236 |
| 29 | 125 | 140 | 154 | 169 | 184 | 199 | 213 | 228 |
| 28 | 121 | 135 | 149 | 163 | 178 | 192 | 206 | 220 |
| 27 | 116 | 130 | 144 | 158 | 171 | 185 | 199 | 213 |
| 26 | 112 | 125 | 139 | 152 | 165 | 178 | 192 | 205 |
| 25 | 108 | 121 | 133 | 146 | 159 | 172 | 184 | 197 |
| 24 | 104 | 116 | 128 | 140 | 153 | 165 | 177 | 189 |
| 23 | 99 | 111 | 123 | 135 | 146 | 158 | 170 | 182 |
| 22 | 95 | 106 | 118 | 129 | 140 | 151 | 163 | 174 |

| probIdx, (ProbLPS >> 9) | (range >> 5)&7 rangeIdx | | | | | | | |
|---|---|---|---|---|---|---|---|---|
| | 0 | 1 | 2 | 3 | 4 | 5 | 6 | 7 |
| 21 | 91 | 102 | 112 | 123 | 134 | 145 | 155 | 166 |
| 20 | 87 | 97 | 107 | 117 | 128 | 138 | 148 | 158 |
| 19 | 82 | 92 | 102 | 112 | 121 | 131 | 141 | 151 |
| 18 | 78 | 87 | 97 | 106 | 115 | 124 | 134 | 143 |
| 17 | 74 | 83 | 91 | 100 | 109 | 118 | 126 | 135 |
| 16 | 70 | 78 | 86 | 94 | 103 | 111 | 119 | 127 |
| 15 | 65 | 73 | 81 | 89 | 96 | 104 | 112 | 120 |
| 14 | 61 | 68 | 76 | 83 | 90 | 97 | 105 | 112 |
| 13 | 57 | 64 | 70 | 77 | 84 | 91 | 97 | 104 |
| 12 | 53 | 59 | 65 | 71 | 78 | 84 | 90 | 96 |
| 11 | 48 | 54 | 60 | 66 | 71 | 77 | 83 | 89 |
| 10 | 44 | 49 | 55 | 60 | 65 | 70 | 76 | 81 |
| 9 | 40 | 45 | 49 | 54 | 59 | 64 | 68 | 73 |
| 8 | 36 | 40 | 44 | 48 | 53 | 57 | 61 | 65 |
| 7 | 31 | 35 | 39 | 43 | 46 | 50 | 54 | 58 |
| 6 | 27 | 30 | 34 | 37 | 40 | 43 | 47 | 50 |
| 5 | 23 | 26 | 28 | 31 | 34 | 37 | 39 | 42 |
| 4 | 19 | 21 | 23 | 25 | 28 | 30 | 32 | 34 |
| 3 | 14 | 16 | 18 | 20 | 21 | 23 | 25 | 27 |
| 2 | 10 | 11 | 13 | 14 | 15 | 16 | 18 | 19 |
| 1 | 6 | 7 | 7 | 8 | 9 | 10 | 10 | 11 |
| 0 | 2 | 2 | 2 | 2 | 3 | 3 | 3 | 3 | wherein "rangeIdx" corresponds to the range index or the clipped range index, "probIdx" corresponds to the LPS probability index, and "rangeIdx" is derived according to (range >>5)&7 and "range" corresponds to the current range.

12. The method of claim 10, wherein the look-up-table corresponds to:

| probIdx, (ProbLPS >> 9) | (range >> 5)&7 rangeIdx | | | | | | | |
|---|---|---|---|---|---|---|---|---|
| | 0 | 1 | 2 | 3 | 4 | 5 | 6 | 7 |
| 31 | 128 | 143 | 159 | 174 | 190 | 205 | 221 | 236 |
| 30 | 124 | 139 | 154 | 169 | 184 | 199 | 214 | 229 |
| 29 | 120 | 134 | 149 | 163 | 178 | 192 | 207 | 221 |
| 28 | 116 | 130 | 144 | 158 | 172 | 186 | 200 | 214 |
| 27 | 112 | 125 | 139 | 152 | 166 | 179 | 193 | 206 |
| 26 | 108 | 121 | 134 | 147 | 160 | 173 | 186 | 199 |
| 25 | 104 | 116 | 129 | 141 | 154 | 166 | 179 | 191 |
| 24 | 100 | 112 | 124 | 136 | 148 | 160 | 172 | 184 |
| 23 | 96 | 107 | 119 | 130 | 142 | 153 | 165 | 176 |
| 22 | 92 | 103 | 114 | 125 | 136 | 147 | 158 | 169 |
| 21 | 88 | 98 | 109 | 119 | 130 | 140 | 151 | 161 |
| 20 | 84 | 94 | 104 | 114 | 124 | 134 | 144 | 154 |
| 19 | 80 | 89 | 99 | 108 | 118 | 127 | 137 | 146 |
| 18 | 76 | 85 | 94 | 103 | 112 | 121 | 130 | 139 |
| 17 | 72 | 80 | 89 | 97 | 106 | 114 | 123 | 131 |
| 16 | 68 | 76 | 84 | 92 | 100 | 108 | 116 | 124 |
| 15 | 64 | 71 | 79 | 86 | 94 | 101 | 109 | 116 |
| 14 | 60 | 67 | 74 | 81 | 88 | 95 | 102 | 109 |
| 13 | 56 | 62 | 69 | 75 | 82 | 88 | 95 | 101 |
| 12 | 52 | 58 | 64 | 70 | 76 | 82 | 88 | 94 |
| 11 | 48 | 53 | 59 | 64 | 70 | 75 | 81 | 86 |
| 10 | 44 | 49 | 54 | 59 | 64 | 69 | 74 | 79 |
| 9 | 40 | 44 | 49 | 53 | 58 | 62 | 67 | 71 |
| 8 | 36 | 40 | 44 | 48 | 52 | 56 | 60 | 64 |
| 7 | 32 | 35 | 39 | 42 | 46 | 49 | 53 | 56 |
| 6 | 28 | 31 | 34 | 37 | 40 | 43 | 46 | 49 |
| 5 | 24 | 26 | 29 | 31 | 34 | 36 | 39 | 41 |
| 4 | 20 | 22 | 24 | 26 | 28 | 30 | 32 | 34 |
| 3 | 16 | 17 | 19 | 20 | 22 | 23 | 25 | 26 |
| 2 | 12 | 13 | 14 | 15 | 16 | 17 | 18 | 19 |
| 1 | 8 | 8 | 9 | 9 | 10 | 10 | 11 | 11 |
| 0 | 4 | 4 | 4 | 4 | 4 | 4 | 4 | 4 | wherein "rangeIdx" corresponds to the range index or the clipped range index, "probIdx" corresponds to the LPS probability index, and "rangeIdx" is derived according to (range>>5)&7 and "range" corresponds to the current range.

13. The method of claim 1, wherein the LPS probability is set equal to a result of bitwise exclusive or (XOR) for a value of (current probability >>(k−1)) and the current probability, or the LPS probability index is set equal to the result of bitwise exclusive or for the value of (current probability >>(k−1)) and the value of (current probability >>(k−n−1)); and wherein the current probability is represented by k-bit values, and n and k are positive integers.

14. The method of claim 1, further comprising deriving, from the current range, a rangeOne value and a rangeZero value for the current bin having a value of one and a value of zero respectively, wherein if the current probability for the binary value of the current bin is greater than 0.5 or is greater than or equal to 0.5, the rangeOne value is set to (the current range−the LPS range) and the rangeZero value is set to the LPS range; and otherwise, the rangeZero value is set to (the current range−the LPS range) and the rangeOne value is set to the LPS range.

15. An entropy coding apparatus for an image or video encoder or decoder, the entropy coding apparatus comprising:

apply context-adaptive arithmetic encoding or decoding to a current bin of a binary data of a current coding symbol according to a current probability for a binary value of the current bin and a current range associated with a current state of the context-adaptive arithmetic encoding or decoding, wherein the current probability is generated according to one or more previously coded symbols before the current coding symbol;

derive an LPS probability index corresponding to an inverted current probability or the current probability depending on whether the current probability for the binary value of the current bin is greater than 0.5;

derive a range index for identifying one range interval containing the current range; and derive an LPS range using one or more mathematical operations comprising calculating a multiplication of a first value related to (2*the LPS probability index+1) or the LPS probability index and a second value related to (2*the range index+1) or the range index, or deriving the LPS range using a look-up-table including table contents corresponding to values of LPS range associated with a set of LPS probability indexes and a set of range indexes for encoding or decoding a binary value of the current bin, wherein the range index corresponds to a result of right-shifting the current range by mm and mm is a non-negative integer and each value of LPS range corresponds to one product of (2*one LPS probability index+1) and (2*one range index+1) or deriving an LPS range corresponds to an offset and one product of one LPS probability index and one range index.

16. The entropy coding apparatus of claim 12, wherein when the current probability for the binary value of the current bin is greater than 0.5, an LPS (least-probably-symbol) probability is set equal to (1−the current probability) and otherwise, the LPS probability is set equal to the current probability; and the LPS probability index is determined based on a target index indicating one probability interval containing the current probability or the LPS probability.

17. The entropy coding apparatus of claim 12, wherein when the current probability for the binary value of the current bin is greater than $2^{k-1}$ or is greater than or equal to $2^{k-1}$, an LPS probability is set equal to ($2^k-1-$the current probability) and the LPS probability index is set equal to $(2^{n+1}-1)$ minus a result of right-shifting the current probability by (k−n−1) bits; otherwise, the LPS probability is set equal to the current probability and the LPS probability index is set equal to the result of right-shifting the current probability by (k−n−1) bits; and wherein the current probability is represented by k-bit values, and n and k are positive integers.

18. The entropy coding apparatus of claim 14, wherein the LPS range is derived by multiplying (2*the LPS probability index+1) with (2*the range index+1) to obtain a multiplication result, and right-shifting the multiplication result by x bits and x is a positive integer.

19. The entropy coding apparatus of claim 14, wherein the LPS range is derived by multiplying the LPS probability index with the range index to obtain a multiplication result, and right-shifting the multiplication result by x bits plus an offset and x is a positive integer, the offset is an integer.

20. The entropy coding apparatus of claim 12, wherein the look-up-table corresponds to a two-dimensional table with the LPS probability index as a first table index in a first dimension and a clipped range index as a second table index in a second dimension, where the clipped range index corresponding to the range index.

21. The entropy coding apparatus of claim 12, wherein the LPS probability is set equal to a result of bitwise exclusive or (XOR) for a value of (current probability >>(k−1)) and the current probability, or the LPS probability index is set equal to the result of bitwise exclusive or for the value of (current probability >>(k−1)) and the value of (current probability >>(k−n−1)); and wherein the current probability is represented by k-bit values, and n and k are positive integers.

22. The entropy coding apparatus of claim 12, further comprising deriving, from the current range, a rangeOne value and a rangeZero value for the current bin having a value of one and a value of zero respectively, wherein if the current probability for the binary value of the current bin is greater than 0.5 or is greater than or equal to 0.5, the rangeOne value is set to (the current range−the LPS range) and the rangeZero value is set to the LPS range; and otherwise, the rangeZero value is set to (the current range−the LPS range) and the rangeOne value is set to the LPS range.

* * * * *